(12) United States Patent
Chen et al.

(10) Patent No.: US 11,122,568 B2
(45) Date of Patent: Sep. 14, 2021

(54) COMMUNICATION METHOD UTILIZING AT LEAST TWO PIECES OF TARGET SUB-CONFIGURATION INFORMATION AND A CO-LOCATION RULE

(71) Applicant: Huawei Technologies Co., Ltd., Shenzhen (CN)

(72) Inventors: Zhe Chen, Shenzhen (CN); Zhe Jin, Beijing (CN); Chenwan Li, Beijing (CN); Weiliang Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 16/522,181

(22) Filed: Jul. 25, 2019

(65) Prior Publication Data

US 2019/0349938 A1    Nov. 14, 2019

Related U.S. Application Data

(63) Continuation of application No. PCT/CN2017/072669, filed on Jan. 25, 2017.

(51) Int. Cl.
| | |
|---|---|
| *H04W 72/04* | (2009.01) |
| *H04W 64/00* | (2009.01) |
| *H04L 29/08* | (2006.01) |

(52) U.S. Cl.
CPC ....... *H04W 72/0453* (2013.01); *H04W 64/00* (2013.01); *H04W 72/042* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 2014/0315594 A1 | 10/2014 | Jeong et al. | |
| 2015/0223245 A1* | 8/2015 | Cheng | H04J 11/0069 |
| | | | 370/329 |

(Continued)

FOREIGN PATENT DOCUMENTS

| | | |
|---|---|---|
| CN | 103945447 A | 7/2014 |
| CN | 104106223 A | 10/2014 |

(Continued)

OTHER PUBLICATIONS

"3rd Generation Partnership Project;Technical Specification Group Radio Access Network;Evolved Universal Terrestrial Radio Access (E-UTRA);LTE Positioning Protocol (LPP)(Release 13)," 3GPP TS 36.355, V13.1.0, pp. 1-141, 3rd Generation Partnership Project, Valbonne, France (Mar. 2016).

(Continued)

*Primary Examiner* — Alex Skripnikov
(74) *Attorney, Agent, or Firm* — Leydig, Voit & Mayer, Ltd.

(57) ABSTRACT

A communication method includes: determining, by a network side device, at least two pieces of target sub-configuration information according to a co-location rule, where at least two target signals corresponding to the at least two pieces of target sub-configuration information are quasi co-located; and sending, by the network side device, the at least two pieces of target sub-configuration information to the terminal device according to the co-location rule.

14 Claims, 6 Drawing Sheets

(56) References Cited

U.S. PATENT DOCUMENTS

| 2016/0192331 A1 | 6/2016 | Liang et al. |
| 2016/0223639 A1 | 8/2016 | Davydov et al. |
| 2016/0254888 A1 | 9/2016 | Nagata et al. |
| 2017/0005764 A1 | 1/2017 | Park et al. |

FOREIGN PATENT DOCUMENTS

| CN | 104349460 A | 2/2015 |
| CN | 104782184 A | 7/2015 |
| CN | 105656607 A | 6/2016 |
| EP | 2824976 A1 | 1/2015 |
| WO | 2016162779 A1 | 10/2016 |

OTHER PUBLICATIONS

"3rd Generation Partnership Project;Technical Specification Group Radio Access Network;Evolved Universal Terrestrial Radio Access (E-UTRA);Physical channels and modulation(Release 14)," 3GPP TS 36.211, V14.1.0, pp. 1-175, 3rd Generation Partnership Project, Valbonne, France (Dec. 2016).

"3rd Generation Partnership Project;Technical Specification Group Radio Access Network;Evolved Universal Terrestrial Radio Access (E-UTRA);Radio Resource Control (RRC);Protocol specification(Release 14)," 3GPP TS 36.331, V14.1.0, pp. 1-654, 3rd Generation Partnership Project, Valbonne, France (Dec. 2016).

"3rd Generation Partnership Project;Technical Specification Group Radio Access Network;Evolved Universal Terrestrial Radio Access (E-UTRA);LTE Positioning Protocol (LPP)(Release 14)," 3GPP TS 36.355, V14.0.0, pp. 1-151, 3rd Generation Partnership Project, Valbonne, France (Dec. 2016).

* cited by examiner

COMMUNICATION METHOD UTILIZING AT LEAST TWO PIECES OF TARGET SUB-CONFIGURATION INFORMATION AND A CO-LOCATION RULE

CROSS-REFERENCE TO RELATED APPLICATIONS

This application is a continuation of International Application No. PCT/CN2017/072669, filed on Jan. 25, 2017, the disclosure of which is hereby incorporated by reference in its entirety.

TECHNICAL FIELD

Embodiments of this application relate to the communications field, and to a communication method, a network side device, and a terminal device.

BACKGROUND

Internet of Things (IoT) is a network in which various devices having specific capabilities of sensing, computation, execution, and communication are deployed to obtain information from a physical world, and a network is used to implement information transmission, coordination, and processing, so as to implement interconnection between humans and things and between things and things. In brief, the Internet of Things intends to implement interconnection and interworking between humans and things and between things and things. The Internet of Things may be applied to various fields such as a smart grid, intelligent agriculture, intelligent transportation, and environmental monitoring.

The mobile communications standards organization 3rd Generation Partnership Project (3GPP) puts forward a subject of Narrowband (NB) Internet of Things, and completes standardization of related physical layer solutions. Currently, a communication method for a network side device and a terminal device in an NB-IoT network is basically the same as a communication method for a Long Term Evolution (LTE) system.

In an existing communication method, a network side device configures a signal based on a frequency layer at which a transmit carrier of the signal is located, a terminal device cannot determine which signals are quasi co-located, and therefore signal measurement accuracy is relatively low.

SUMMARY

This application provides a communication method, a network side device, and a terminal device, to improve signal measurement accuracy.

According to a first aspect, a communication method is provided, including: determining, by a network side device, at least two pieces of target sub-configuration information according to a co-location rule, where at least two target signals corresponding to the at least two pieces of target sub-configuration information are quasi co-located; and sending, by the network side device, the at least two pieces of target sub-configuration information to the terminal device according to the co-location rule.

According to the communication method in this embodiment of this application, after determining the at least two pieces of target sub-configuration information according to the co-location rule, the network side device sends the at least two pieces of target sub-configuration information to the terminal device according to the co-location rule, so that after receiving the at least two pieces of target sub-configuration information, the terminal device determines quasi co-located target signals according to the co-location rule, and the terminal device may perform correlation processing on the quasi co-located target signals, to improve measurement accuracy of the target signals.

In this embodiment of this application, each piece of target sub-configuration information is used by the terminal device to determine a transmit carrier of a target signal corresponding to the target configuration information.

It should be noted that, that the at least two pieces of target sub-configuration information are corresponding to at least two target signals may be that one piece of target sub-configuration information is corresponding to one target signal, or may be that one piece of target sub-configuration information is corresponding to at least two target signals, or may be that at least two pieces of target sub-configuration information are corresponding to one target signal.

With reference to the first aspect, in an implementation of the first aspect, the co-location rule is that at least two signals corresponding to at least two pieces of sub-configuration information included in one piece of configuration information are quasi co-located; and the sending, by the network side device, the at least two pieces of target sub-configuration information to the terminal device according to the co-location rule includes: determining, by the network side device, target configuration information according to the co-location rule, where the target configuration information includes the at least two pieces of target sub-configuration information; and sending, by the network side device, the target configuration information to the terminal device.

Therefore, the network side device does not need to indicate, to the terminal device by using separate signaling, which signals are quasi co-located, so that signaling overheads can be reduced.

With reference to the first aspect and the foregoing implementation of the first aspect, in another implementation of the first aspect, the co-location rule is that at least two signals corresponding to different pieces of sub-configuration information for which values of quasi co-location identifier ID fields are the same are quasi co-located; and the determining, by a network side device, at least two pieces of target sub-configuration information according to a co-location rule includes: determining, by the network side device according to the co-location rule, a value of a target quasi co-location ID field included in each piece of target sub-configuration information, where values of target quasi co-location ID fields included in the at least two pieces of target sub-configuration information are the same.

Therefore, when receiving the target sub-configuration information, the terminal device can determine, based on the value of the target quasi co-location ID field carried in the target sub-configuration information, which target signals corresponding to target sub-configuration information are quasi co-located, and the network side device does not need to indicate, to the terminal device by using separate signaling, which signals are quasi co-located, so that signaling overheads can be reduced. In addition, the network side device can transmit each of the at least two pieces of target sub-configuration information to the terminal device, so that each transmission load can be reduced, and transmission reliability of the target sub-configuration information is ensured.

With reference to the first aspect and the foregoing implementations of the first aspect, in another implementation of the first aspect, the determining a value of a target quasi co-location ID field included in each piece of target sub-configuration information includes: determining an identifier of a target cell as the value of the target quasi co-location ID field, where the target cell is a cell to which a target carrier belongs, and the target carrier is a carrier in a cellular network in which transmit carriers of the at least two target signals are jointly located, or the target carrier is a transmit carrier of any target signal in the at least two target signals; or determining an identifier of a target transmission point as the value of the target quasi co-location ID field, where the target transmission point is a transmission point jointly corresponding to transmit carriers of the at least two target signals.

With reference to the first aspect and the foregoing implementations of the first aspect, in another implementation of the first aspect, the target quasi co-location ID field includes a first subfield and a second subfield; and the determining a value of a target quasi co-location ID field included in each piece of target sub-configuration information includes: determining an identifier of a target cell as a value of the first subfield, where the target cell is a cell to which a target carrier belongs, and the target carrier is a carrier in a cellular network in which transmit carriers of the at least two target signals are jointly located, or the target carrier is a transmit carrier of any target signal in the at least two target signals; and determining an identifier of a target transmission point as a value of the second subfield, where the target transmission point is a transmission point jointly corresponding to transmit carriers of the at least two target signals.

Therefore, the communication method in this embodiment of this application can support a communication scenario in which a plurality of transmission points share a cell identifier.

With reference to the first aspect and the foregoing implementations of the first aspect, in another implementation of the first aspect, the co-location rule is that at least two signals corresponding to at least two pieces of sub-configuration information included in different pieces of configuration information for which values of quasi co-location ID fields are the same are quasi co-located, and at least two signals corresponding to at least two pieces of sub-configuration information included in one piece of configuration information are quasi co-located; and the sending, by the network side device, the at least two pieces of target sub-configuration information to the terminal device according to the co-location rule includes: determining, by the network side device, target configuration information according to the co-location rule, where the target configuration information includes the at least two pieces of target sub-configuration information and a target quasi co-location ID field; and sending, by the network side device, the target configuration information to the terminal device.

Therefore, after receiving the configuration information, the terminal device may determine, based on the value of the target quasi co-location ID field carried in the configuration information, which target signals corresponding to target sub-configuration information are quasi co-located, and the network side device does not need to indicate, to the terminal device by using separate signaling, which signals are quasi co-located, so that signaling overheads can be reduced.

With reference to the first aspect and the foregoing implementations of the first aspect, in another implementation of the first aspect, transmit carriers of the at least two target signals are located in one target carrier in a cellular network, the target configuration information further includes center frequency information of the target carrier, each piece of target sub-configuration information includes offset information, and the offset information is used by the terminal device to determine, based on the center frequency information and the offset information, a transmit carrier of a target signal corresponding to the target sub-configuration information.

According to the communication method in this embodiment of this application, the configuration information includes the center frequency information of the target carrier, and each piece of target sub-configuration information includes the offset information, so that the terminal device can determine a transmit carrier of each target signal based on the center frequency information and on the offset information included in each piece of target sub-configuration information. Therefore, the network side device does not need to add information about the transmit carrier of the target signal corresponding to each piece of target sub-configuration information to each piece of target sub-configuration information, so that signaling overheads are reduced.

With reference to the first aspect and the foregoing implementations of the first aspect, in another implementation of the first aspect, transmit carriers of at least two target signals in the at least two target signals are different.

With reference to the first aspect and the foregoing implementations of the first aspect, in another implementation of the first aspect, the at least two target signals are positioning reference signals.

Therefore, the terminal device may determine quasi co-located positioning reference signals according to the method in this embodiment of this application, and perform correlation processing on the quasi co-located positioning reference signals, so as to improve measurement accuracy of the positioning reference signals, and improve positioning accuracy of the terminal device.

According to a second aspect, a communication method is provided, including: receiving, by a terminal device, at least two pieces of target sub-configuration information sent by a network side device, where the at least two pieces of target sub-configuration information are determined by the network side device according to a co-location rule, and at least two target signals corresponding to the at least two pieces of target sub-configuration information are quasi co-located; and determining, by the terminal device according to the co-location rule, that the at least two target signals are quasi co-located.

According to the communication method in this embodiment of this application, the terminal device receives the at least two pieces of target sub-configuration information sent by the network side device, the at least two target signals corresponding to the at least two pieces of target sub-configuration information are quasi co-located, and then the terminal device determines, according to the co-location rule, that the at least two target signals corresponding to the at least two pieces of target sub-configuration information are quasi co-located, so that the terminal device can perform correlation processing on the quasi co-located target signals, and measurement accuracy of the target signals is improved.

With reference to the second aspect, in an implementation of the second aspect, the co-location rule is that at least two signals corresponding to at least two pieces of sub-configuration information included in one piece of configuration information are quasi co-located; and the receiving, by a terminal device, at least two pieces of target sub-configuration information sent by a network side device includes: receiving, by the terminal device, target configuration information sent by the network side device, where the target configuration information includes the at least two pieces of target sub-configuration information.

Therefore, after receiving the configuration information, the terminal device can determine, according to the co-location rule, which signals are quasi co-located, and the network side device does not need to indicate, to the terminal device by using separate signaling, which signals are quasi co-located, so that signaling overheads can be reduced.

With reference to the second aspect and the foregoing implementation of the second aspect, in another implementation of the second aspect, the co-location rule is that at least two signals corresponding to different pieces of sub-configuration information for which values of quasi co-location identifier ID fields are the same are quasi co-located; and the receiving, by a terminal device, at least two pieces of target sub-configuration information sent by a network side device includes: receiving, by the terminal device, the at least two pieces of target sub-configuration information sent by the network side device, where each piece of target sub-configuration information includes a target quasi co-location ID field, and values of target quasi co-location ID fields included in the at least two pieces of target sub-configuration information are the same.

Therefore, after receiving the target sub-configuration information, the terminal device can determine, based on the value of the target quasi co-location ID field carried in the target sub-configuration information, which target signals corresponding to target sub-configuration information are quasi co-located, and the network side device does not need to indicate, to the terminal device by using separate signaling, which signals are quasi co-located, so that signaling overheads can be reduced. In addition, the network side device can transmit each of the at least two pieces of target sub-configuration information to the terminal device, so that each transmission load can be reduced, and transmission reliability of the target sub-configuration information is ensured.

With reference to the second aspect and the foregoing implementations of the second aspect, in another implementation of the second aspect, the value of the target quasi co-location ID field is an identifier of a target cell, the target cell is a cell to which a target carrier belongs, and the target carrier is a carrier in a cellular network in which transmit carriers of the at least two target signals are jointly located, or the target carrier is a transmit carrier of any target signal in the at least two target signals; or the value of the target quasi co-location ID field is an identifier of a target transmission point, where the target transmission point is a transmission point jointly corresponding to transmit carriers of the at least two target signals.

With reference to the second aspect and the foregoing implementations of the second aspect, in another implementation of the second aspect, the target quasi co-location ID field includes a first subfield and a second subfield, a value of the first subfield is an identifier of a target cell, a value of the second subfield is an identifier of a target transmission point, the target cell is a cell to which a target carrier belongs, the target carrier is a carrier in a cellular network in which transmit carriers of the at least two target signals are jointly located, or the target carrier is a transmit carrier of any target signal in the at least two target signals, and the target transmission point is a transmission point jointly corresponding to transmit carriers of the at least two target signals.

Therefore, the communication method in this embodiment of this application can support a communication scenario in which a plurality of transmission points share a cell identifier.

With reference to the second aspect and the foregoing implementations of the second aspect, in another implementation of the second aspect, the co-location rule is that at least two signals corresponding to at least two pieces of sub-configuration information included in different pieces of configuration information for which values of quasi co-location ID fields are the same are quasi co-located, and at least two signals corresponding to at least two pieces of sub-configuration information included in one piece of configuration information are quasi co-located; and the receiving, by a terminal device, at least two pieces of target sub-configuration information sent by a network side device includes: receiving, by the terminal device, target configuration information sent by the network side device, where the target configuration information includes the at least two pieces of target sub-configuration information and a target quasi co-location ID field.

Therefore, after receiving the configuration information, the terminal device may determine, based on the value of the target quasi co-location ID field carried in the configuration information, which target signals corresponding to target sub-configuration information are quasi co-located, and the network side device does not need to indicate, to the terminal device by using separate signaling, which signals are quasi co-located, so that signaling overheads can be reduced.

With reference to the second aspect and the foregoing implementations of the second aspect, in another implementation of the second aspect, transmit carriers of the at least two target signals are located in one target carrier in a cellular network, the target configuration information further includes center frequency information of the target carrier, each piece of target sub-configuration information includes offset information, and the offset information is used by the terminal device to determine, based on the center frequency information and the offset information, a transmit carrier of a target signal corresponding to the target sub-configuration information; and the method further includes: determining, by the terminal device, a transmit carrier of each target signal based on the center frequency information and on the offset information included in each piece of target sub-configuration information; and receiving, by the terminal device, the at least two target signals based on the transmit carrier of each target signal.

With reference to the second aspect and the foregoing implementations of the second aspect, in another implementation of the second aspect, the method further includes: determining, by the terminal device, a signal processing result based on the at least two target signals; and sending, by the terminal device, the signal processing result to the network side device.

Because the terminal device reports only one signal processing result for the at least two target signals to the network side device, reporting overheads can be reduced.

Optionally, the terminal device receives indication information sent by the network side device, and the terminal device determines, based on the indication information, a manner of reporting the signal processing result.

With reference to the second aspect and the foregoing implementations of the second aspect, in another implementation of the second aspect, transmit carriers of at least two target signals in the at least two target signals are different.

With reference to the second aspect and the foregoing implementations of the second aspect, in another implementation of the second aspect, the at least two target signals are positioning reference signals.

Therefore, the terminal device may determine quasi co-located positioning reference signals according to the method in this embodiment of this application, and perform correlation processing on the quasi co-located positioning reference signals, so as to improve measurement accuracy of the positioning reference signals, and improve positioning accuracy of the terminal device.

According to a third aspect, a communication method is provided, including: determining, by a network side device, frequency information and at least two pieces of sub-configuration information, where transmit carriers of at least two signals corresponding to the at least two pieces of sub-configuration information are located in one target carrier in a cellular network, the frequency information is used to indicate a center frequency of the target carrier, each piece of sub-configuration information includes offset information, and the offset information is used by a terminal device to determine, based on the offset information and the frequency information, a transmit carrier of a signal corresponding to the sub-configuration information; and sending, by the network side device, the frequency information and the at least two pieces of sub-configuration information to the terminal device.

According to the communication method in this embodiment of this application, the network side device sends the frequency information of the target carrier and the at least two pieces of sub-configuration information to the terminal device, and each piece of sub-configuration information includes the offset information, so that the terminal device determines, based on the frequency information of the target carrier and the offset information included in each piece of sub-configuration information, the transmit carrier of the signal corresponding to the sub-configuration information. Therefore, each piece of sub-configuration information does not need to carry the frequency information of the transmit carrier of the signal corresponding to the sub-configuration information, so that signaling overheads can be reduced.

With reference to the third aspect, in an implementation of the third aspect, the sending, by the network side device, the frequency information and the at least two pieces of sub-configuration information to the terminal device includes: sending, by the network side device, configuration information to the terminal device, where the configuration information includes the frequency information and the at least two pieces of sub-configuration information.

According to a fourth aspect, a communication method is provided, including: receiving, by a terminal device, frequency information and at least two pieces of sub-configuration information that are sent by a network side device, where transmit carriers of at least two signals corresponding to the at least two pieces of sub-configuration information are located in one target carrier in a cellular network, the frequency information is used to indicate a center frequency of the target carrier, each piece of sub-configuration information includes offset information, and the offset information is used by the terminal device to determine, based on the offset information and the frequency information, a transmit carrier of a signal corresponding to the sub-configuration information; and determining, by the terminal device, a transmit carrier of each of the at least two signals based on the frequency information and the at least two pieces of sub-configuration information.

According to the communication method in this embodiment of this application, the terminal device receives the frequency information of the target carrier and the at least two pieces of sub-configuration information that are sent by the network side device, each piece of sub-configuration information includes the offset information, and then the terminal device determines, based on the frequency information of the target carrier and the offset information included in each piece of sub-configuration information, the transmit carrier of the signal corresponding to the sub-configuration information. Therefore, each piece of sub-configuration information does not need to carry the frequency information of the transmit carrier of the signal corresponding to the sub-configuration information, so that signaling overheads can be reduced.

With reference to the fourth aspect, in an implementation of the fourth aspect, the receiving, by a terminal device, frequency information and a plurality of pieces of sub-configuration information that are sent by a network side device includes: receiving, by the terminal device, configuration information sent by the network side device, where the configuration information includes the frequency information and the at least two pieces of sub-configuration information.

According to a fifth aspect, a network side device is provided and configured to perform the method in any one of the first aspect or the possible implementations of the first aspect. Specifically, the network side device includes units configured to perform the method in any one of the first aspect or the possible implementations of the first aspect.

According to a sixth aspect, a terminal device is provided and configured to perform the method in any one of the second aspect or the possible implementations of the second aspect. Specifically, the terminal device includes units configured to perform the method in any one of the second aspect or the possible implementations of the second aspect.

According to a seventh aspect, a network side device is provided and configured to perform the method in any one of the third aspect or the possible implementations of the third aspect. Specifically, the network side device includes units configured to perform the method in any one of the third aspect or the possible implementations of the third aspect.

According to an eighth aspect, a terminal device is provided and configured to perform the method in any one of the fourth aspect or the possible implementations of the fourth aspect. Specifically, the terminal device includes units configured to perform the method in any one of the fourth aspect or the possible implementations of the fourth aspect.

According to a ninth aspect, a network side device is provided, including a processor, a memory, and a transceiver. The processor, the memory, and the transceiver communicate with each other by using an inner connection path, and transmit a control signal and/or a data signal, so that the network side device performs the method in any one of the first aspect or the possible implementations of the first aspect.

According to a tenth aspect, a terminal device is provided, including a processor, a memory, and a transceiver. The processor, the memory, and the transceiver communicate with each other by using an inner connection path, and transmit a control signal and/or a data signal, so that the terminal device performs the method in any one of the second aspect or the possible implementations of the second aspect.

According to an eleventh aspect, a network side device is provided, including a processor, a memory, and a transceiver. The processor, the memory, and the transceiver communicate with each other by using an inner connection path, and transmit a control signal and/or a data signal, so that the network side device performs the method in any one of the third aspect or the possible implementations of the third aspect.

According to a twelfth aspect, a terminal device is provided, including a processor, a memory, and a transceiver. The processor, the memory, and the transceiver communicate with each other by using an inner connection path, and transmit a control signal and/or a data signal, so that the terminal device performs the method in any one of the fourth aspect or the possible implementations of the fourth aspect.

According to a thirteenth aspect, a computer readable medium is provided and configured to store a computer program, and the computer program includes an instruction used to perform the method in any one of the first aspect or the possible implementations of the first aspect.

According to a fourteenth aspect, a computer readable medium is provided and configured to store a computer program, and the computer program includes an instruction used to perform the method in any one of the second aspect or the possible implementations of the second aspect.

According to a fifteenth aspect, a computer readable medium is provided and configured to store a computer program, and the computer program includes an instruction used to perform the method in any one of the third aspect or the possible implementations of the third aspect.

According to a sixteenth aspect, a computer readable medium is provided and configured to store a computer program, and the computer program includes an instruction used to perform the method in any one of the fourth aspect or the possible implementations of the fourth aspect.

DESCRIPTION OF EMBODIMENTS

The following clearly describes technical solutions in embodiments of this application with reference to the accompanying drawings.

It should be understood that technical solutions of embodiments of the present application may be applied to various communications systems, such as Global System for Mobile Communications (GSM), a Code Division Multiple Access (CDMA) system, a Wideband Code Division Multiple Access (WCDMA) system, a general packet radio service (GPRS) system, a LTE system, an LTE frequency division duplex (FDD) system, an LTE time division duplex (TDD) system, Universal Mobile Telecommunications System (UMTS) or a Worldwide Interoperability for Microwave Access (WiMAX) communications system, a 5G system, or a new radio (NR) system.

It should be understood that in embodiments of this application, a terminal device may include but is not limited to a mobile station (MS), a mobile terminal, a mobile telephone, user equipment (UE), a handset, portable equipment, a vehicle, and the like. The terminal device may communicate with one or more core networks by using a radio access network (RAN). For example, the terminal device may be a mobile telephone (or referred to as a "cellular" telephone), or a computer having a wireless communication function; or the terminal device may be a portable, pocket-sized, handheld, computer built-in, or in-vehicle mobile apparatus.

A network side device in embodiments of this application is an apparatus that is deployed in a radio access network and that is configured to provide a wireless communication function for the terminal device. The network side device may be a base station, and the base station may include various forms such as a macro base station, a micro base station, a relay station, or an access point. In systems in which different radio access technologies are used, devices that have base station functions may have different names. For example, in an LTE network, a device that has a base station function is referred to as an evolved NodeB (eNB or eNodeB); in a third generation (3G) network, a device that has a base station function is referred to as a NodeB (Node B); and the like. The network side device related in embodiments of this application further includes a server providing a positioning service. For example, the network side device may be a server configured for control-plane positioning, or may be a server configured for user-plane positioning.

Figure 1:
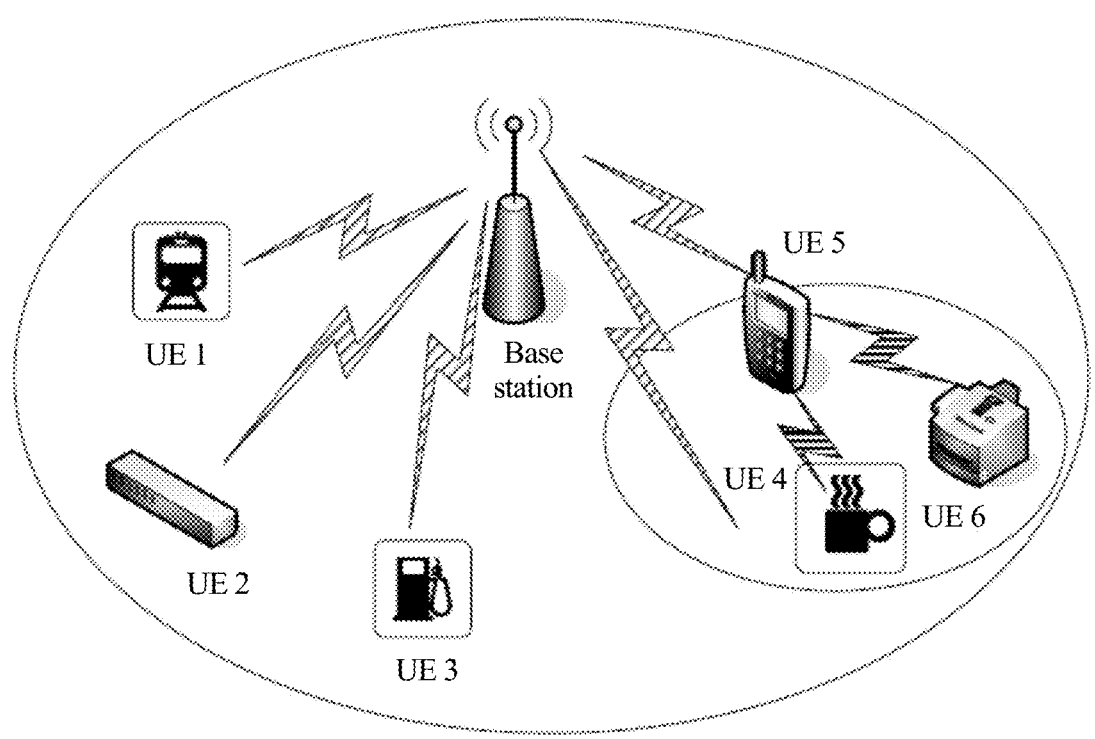
FIG. 1 is a schematic diagram of an application scenario according to an embodiment of this application.

FIG. 1 is a schematic diagram of an application scenario according to an embodiment of this application. As shown in FIG. 1, a base station and six terminal devices (UE1 to UE6) form a communications system. In the communications system, the base station transmits information to one or more UEs of the six UEs. The UE4 to the UE6 form another communications system. In the communications system, the UE5 may send information to the UE4 and/or the UE6. The communications system formed by the UE4 to the UE6 may be referred to as a Narrowband Internet of Things (NB-IoT) system.

The following describes a communication method according to embodiments of the present application with reference to the application scenario shown in FIG. 1.

In embodiments of this application, a signal includes but is not limited to a positioning reference signal (PRS) and a downlink reference signal. However, for ease of description, descriptions of exemplary embodiments are provided by using the signal being a PRS.

It should be noted that a positioning reference signal (sent on an NB-IoT carrier) in the NB-IoT system is a new positioning reference signal that is different from a positioning reference signal (sent on an LTE carrier) in an LTE system, and the positioning reference signal in the NB-IoT system may be referred to as a narrowband positioning reference signal (NPRS). To support Observed Time Difference Of Arrival (OTDOA) positioning, UE in the NB-IoT system measures an NPRS in an NB-IoT carrier, and obtains a positioning measurement. For ease of description of exemplary embodiments, the NPRS in the NB-IoT system and the PRS in the LTE are collectively referred to as a PRS.

Generally, in an OTDOA positioning technology, a plurality of base stations send PRSs to a terminal device, and the terminal device obtains information about time of arrival of the signals by measuring the PRSs sent by the plurality of base stations. The terminal device may report the measured information about the time of arrival of the PRS signals to a network side, and the network side calculates a geographic location of the terminal device based on geographic locations of the plurality of base stations. Alternatively, the terminal device may calculate a geographic location of the terminal device based on the measured information about the time of arrival of the PRS signals with reference to geographic locations of the plurality of base stations that are indicated by a network side.

In a related solution in the prior art, the network side supports notifying the UE of PRS configuration information on a plurality of carriers with different center frequencies. When configuring a PRS of a neighbor cell, the network side divides a plurality of neighbor cells into a plurality of sets (a maximum of 3) based on frequency layers at which the plurality of neighbor cells are located. A plurality of neighbor cells at one frequency layer belong to one set, and PRS configuration information of each cell is separately indicated. Therefore, the terminal device cannot determine which PRSs in received PRSs are quasi co-located (QCL), the terminal device has to process the received PRSs one by one. This affects positioning accuracy of the terminal device.

Therefore, embodiments of this application provide a communication method. When the method is applied to the OTDOA positioning technology, the terminal device can determine which PRS signals in the received PRS signals are quasi co-located, and perform combined processing on quasi co-located PRS signals, so as to improve positioning accuracy of the terminal device.

Figure 2:
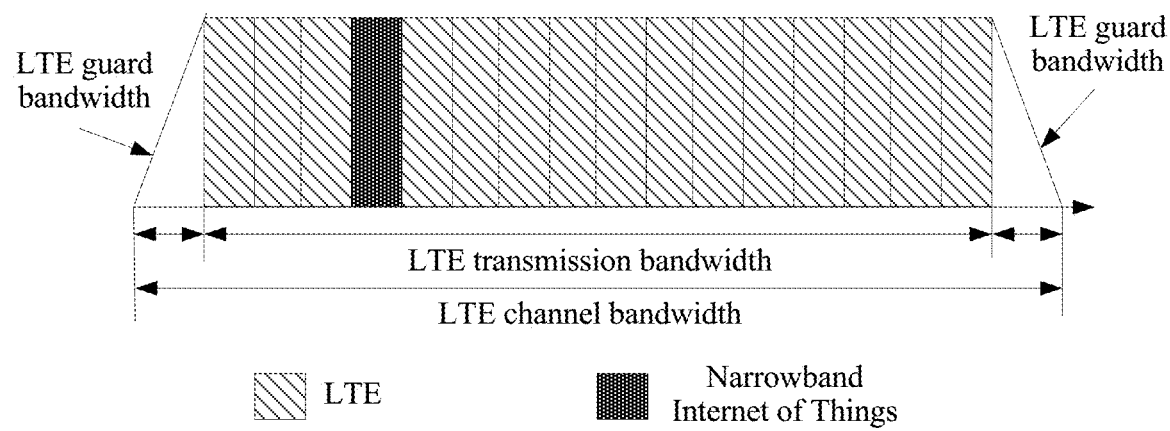
FIG. 2 is a schematic diagram of channel bandwidth in an LTE network.

In embodiments of this application, a carrier refers to a frequency domain resource that has a center frequency and specific bandwidth. Bandwidth of a carrier in a cellular network is channel bandwidth in the cellular network. As shown in FIG. 2, the cellular network is an LTE network, and the channel bandwidth includes transmission bandwidth and guard bandwidth.

In embodiments of this application, that transmit carriers of two signals are different may be understood as that center frequencies of the transmit carriers of the two signals are the same, but the transmit carriers of the two signals are corresponding to different transmission points (TP) or different cells; or that transmit carriers of two signals are different may be understood as that center frequencies of the transmit carriers of the two signals are different.

In embodiments of this application, that at least two signals are quasi co-located may be understood as one or more of the following cases: The at least two signals may be transmitted from a same cell. The at least two signals may be transmitted from one TP, and a transmitter applies a same transmission processing module to the at least two signals. The at least two signals may experience a same channel characteristic, that the at least two signals experience a same channel characteristic may be understood as that a channel characteristic experienced by a signal may be inferred from a channel characteristic experienced by another signal in the at least two channels, and the channel characteristic includes one or more of a path loss, shadow fading, a channel time-domain response, a channel frequency-domain response, delay spread, Doppler spread, a Doppler frequency shift, an average gain, or an average delay. The at least two signals may be transmitted from one antenna or one group of antennas that use same precoding and/or a same antenna weighting factor, in other words, the at least two signals are transmitted by the same transmit antenna. In these cases, the terminal device may perform coherent combination processing on the at least two signals.

Figure 3:
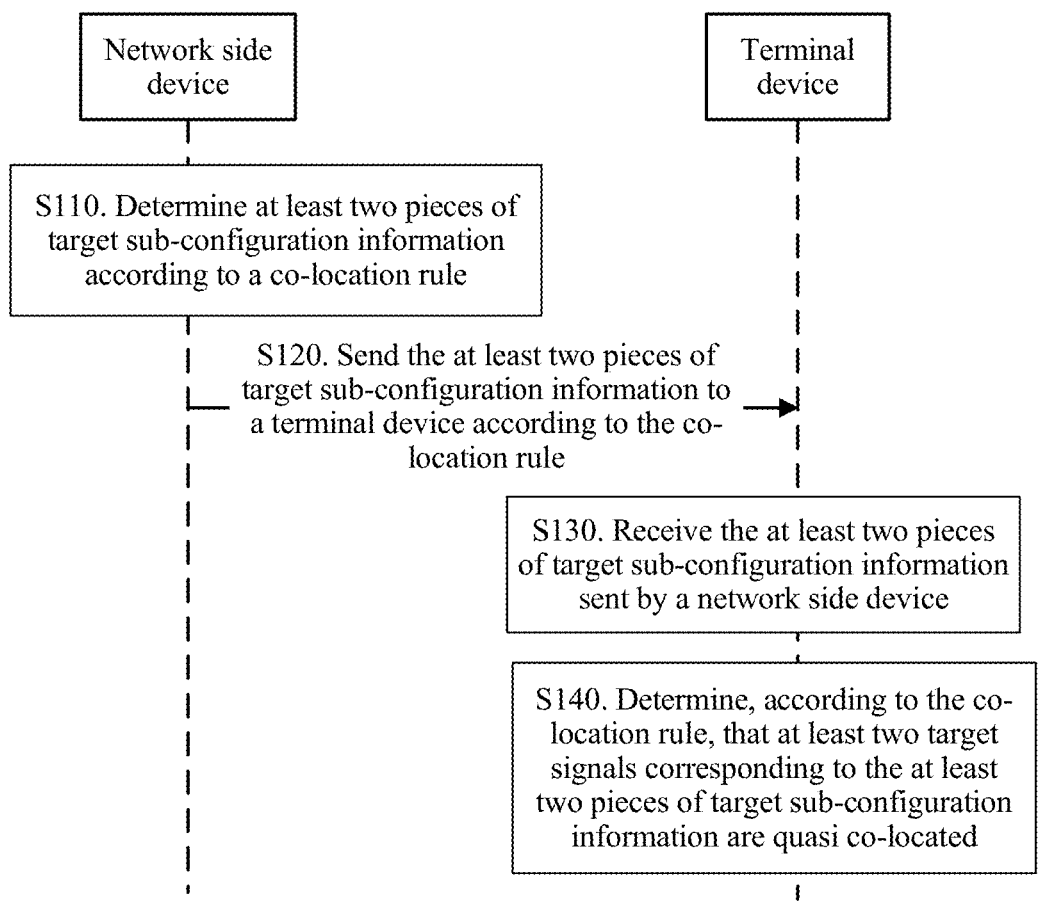
FIG. 3 is a schematic flowchart of a communication method according to an embodiment of this application.

It should be noted that in descriptions of exemplary embodiments, "a plurality of" and "at least two" have a same meaning. The following describes in detail the communication method according to embodiments of this application with reference to the foregoing descriptions. FIG. 3 is a schematic flowchart of a communication method according to an embodiment of this application. As shown in FIG. 3, a method 100 includes the following steps.

S110. A network side device determines at least two pieces of target sub-configuration information according to a co-location rule, where at least two target signals corresponding to the at least two pieces of target sub-configuration information are quasi co-located.

S120. The network side device sends the at least two pieces of target sub-configuration information to a terminal device according to the co-location rule.

S130. The terminal device receives the at least two pieces of target sub-configuration information sent by the network side device.

S140. The terminal device determines, according to the co-location rule, that the at least two target signals corresponding to the at least two pieces of target sub-configuration information are quasi co-located.

In this embodiment of this application, optionally, transmit carriers of at least two target signals in the at least two target signals corresponding to the at least two pieces of target sub-configuration information are different.

Optionally, in an example, the co-location rule is that at least two signals corresponding to at least two pieces of sub-configuration information included in one piece of configuration information are quasi co-located. To be specific, the network side device may add sub-configuration information corresponding to at least two quasi co-located signals to one piece of configuration information, and send the configuration information to UE.

For example, the network side device is an enhanced serving mobile location center (E-SMLC) device, and a signal is a PRS. If the network side device determines that at least two PRSs are QCL, the E-SMLC sends PRS configuration information to UE, and the PRS configuration information includes at least two pieces of PRS sub-configuration information. If the network side device determines that two PRSs are not QCL, the network side device separately adds PRS sub-configuration information corresponding to the two PRSs to two pieces of configuration information, and sends the two pieces of configuration information to UE.

It may be understood that the E-SMLC may send one or more pieces of configuration information to the UE. The E-SMLC may send configuration information to a base station, and then the base station sends the configuration information to the UE in a broadcast or unicast manner.

Specifically, in some embodiments, by sending one piece of configuration information including sub-configuration information corresponding to QCL PRSs to the UE, the E-SMLC may send, to the UE, sub-configuration information corresponding to QCL PRSs sent on carriers of a same type. For example, the configuration information sent by the E-SMLC to the UE is {NB-IoT carrier configuration information #1, NB-IoT carrier configuration information #2, . . . , and NB-IoT carrier configuration information #n}, where n=1, . . . , and N, and N is a positive integer greater than or equal to 1. Each piece of NB-IoT configuration information includes a plurality of pieces of PRS sub-configuration information. For example, it can be indicated as follows: NB-IoT carrier configuration information #n={NB-IoT carrier #1 PRS sub-configuration information, NB-IoT carrier #2 PRS sub-configuration information, . . . , and NB-IoT carrier #m PRS sub-configuration information}, where m=1, . . . , and M, and M is a positive integer greater than or equal to 1. Quantities of pieces of NB-IoT carrier PRS sub-configuration information included in any two pieces of NB-IoT carrier configuration information may be the same or may be different.

In other embodiments, by sending one piece of configuration information including sub-configuration information corresponding to QCL PRSs to the UE, the E-SMLC may send, to the UE, sub-configuration information corresponding to QCL PRSs sent on carriers of different types. For example, the configuration information sent by the E-SMLC to the UE is {configuration information #1, configuration information #2, . . . , and configuration information #n}, where n=1, . . . , and N, and N is a positive integer greater than or equal to 1. Each piece of configuration information includes a plurality of pieces of PRS sub-configuration information corresponding to the PRSs sent on the carriers of different types. For example, it can be indicated as follows: configuration information #n={NB-IoT carrier #1 PRS sub-configuration information, NB-IoT carrier #2 PRS sub-configuration information, . . . , NB-IoT carrier #m PRS sub-configuration information, LTE carrier #1 PRS sub-configuration information, . . . , and LTE carrier #q PRS sub-configuration information}, where m=1, . . . , and M, q=1, . . . , and Q, M is a positive integer greater than or equal to 1, and Q is a positive integer greater than or equal to 1. Quantities of pieces of NB-IoT carrier PRS sub-configuration information included in any two pieces of configuration information may be the same or may be different. Quantities of pieces of LTE carrier PRS sub-configuration information included in any two pieces of configuration information may be the same or may be different.

Correspondingly, after receiving the configuration information, the UE determines, according to the co-location rule, that the PRSs corresponding to the at least two pieces of sub-configuration information included in the configuration information are QCL. For each piece of configuration information, the UE may obtain one or more positioning measurements based on the at least two PRSs corresponding to the at least two pieces of sub-configuration information included in each piece of configuration information, and report the one or more positioning measurements to the E-SMLC.

Specifically, in some embodiments, the E-SMLC and the UE may agree, in advance, on a manner of reporting a positioning measurement. For example, the E-SMLC and the UE may agree, in advance, that the UE only needs to report one positioning measurement for the at least two PRS signals. Therefore, the UE determines one positioning measurement based on the at least two PRS signals, and reports the positioning measurement to the E-SMLC.

Specifically, in other embodiments, the UE may determine, based on received indication information sent by the E-SMLC, a manner of reporting a positioning measurement.

For example, if the indication information sent by the E-SMLC instructs the UE to report all obtained positioning measurements, after receiving the configuration information, the UE measures the PRSs based on the configuration information, and reports all positioning measurements obtained through measurement to the E-SMLC.

For example, if the indication information sent by the E-SMLC indicates to the UE that the UE only needs to report one positioning measurement for quasi co-located PRS signals sent on an NB-IoT carrier and/or for quasi co-located PRS signals sent on an LTE carrier, the UE reports only one positioning measurement for the PRS signals sent on the NB-IoT carrier and/or for the PRS signals sent on the LTE carrier.

For another example, if the indication information sent by the E-SMLC indicates to the UE that the UE preferably reports one positioning measurement for quasi co-located PRS signals sent on an NB-IoT carrier and/or for quasi co-located PRS signals sent on an LTE carrier, the UE preferably reports one positioning measurement for the PRS signals sent on the NB-IoT carrier and/or for the PRS signals sent on the LTE carrier. If the UE can continue to report, the UE reports another positioning measurement to the E-SMLC.

Optionally, in the foregoing embodiments, when the UE only needs to report one positioning measurement to the E-SMLC, the UE may receive and measure each PRS to obtain a positioning measurement, and finally obtain a plurality of positioning measurements, and then the UE may report a positioning measurement of best measurement quality to the E-SMLC. Alternatively, the UE may obtain a positioning measurement by performing weighted averaging on the positioning measurements, and report the positioning measurement to the E-SMLC. Alternatively, the UE may receive and measure a plurality of PRSs jointly, to be specific, the PRSs are considered as a signal entirety. The UE performs sliding correlation processing on the received PRS signals to obtain a positioning measurement, and reports the positioning measurement to the E-SMLC.

Optionally, in an example, the co-location rule is that a plurality of signals corresponding to different pieces of sub-configuration information for which values of quasi co-location identifier ID fields are the same are QCL. To be specific, in each piece of sub-configuration information, the network side device may introduce an ID (QCL_ID) field that is used to indicate a QCL relationship. If values of quasi co-location ID fields in a plurality of pieces of sub-configuration information are the same, signals corresponding to the plurality of pieces of sub-configuration information are QCL. If values of quasi co-location ID fields in two pieces of sub-configuration information are different, signals corresponding to the two pieces of sub-configuration information are not QCL. In addition, the QCL_ID field in the sub-configuration information may be a new field added to existing sub-configuration information, or the QCL_ID field may be a field in existing sub-configuration information.

Likewise, for example, the network side device is an E-SMLC device, and a signal is a PRS. If the network side device determines that a plurality of PRS signals are QCL, the network side device needs to configure the same value for QCL_ID fields configured in PRS sub-configuration information corresponding to the PRSs.

Optionally, in an example, if the network side device determines that transmit carriers of the plurality of PRS signals are jointly located in one target carrier in a cellular network, for example, the transmit carriers (NB-IoT carriers) of the plurality of PRS signals are jointly located in one LTE carrier in an LTE network, the network side device determines a physical cell identifier (PCID) or an E-UTRAN cell global identifier (ECGI) of a cell to which the LTE carrier belongs as the value of the QCL_ID field. Alternatively, if the network side device determines that transmit carriers of the plurality of PRS signals are jointly corresponding to one TP, the network side device determines an identifier of the TP as the value of the QCL_ID field. Alternatively, the network side device may determine a PCID or an ECGI of a cell to which a transmit carrier of any PRS signal in the plurality of PRS signals belongs as the value of the QCL_ID field. Alternatively, the network side device may determine any value as the value of the QCL_ID field.

Optionally, in another example, the QCL_ID field includes two subfields, for example, a first subfield and a second subfield. If the network side device determines that transmit carriers of the plurality of PRS signals are located in one target carrier in a cellular network, and the transmit carriers of the plurality of PRS signals are corresponding to one TP, the network side device determines a PCID or an ECGI of a cell to which the target carrier belongs as a value of the first subfield, and determines an identifier of the TP as a value of the second subfield. Alternatively, the network side device determines a PCID or an ECGI of a cell to which a transmit carrier of any PRS of the plurality of PRS signals belongs as a value of the first subfield, and determines a value of the TP as a value of the second subfield. Alternatively, the network side device determines any value as a value of the first subfield, and determines any other value as a value of the second subfield. It may be understood that the "first" and the "second" herein are merely intended to distinguish between different subfields, but do not constitute a limitation on the subfields.

Specifically, in some embodiments, by indicating which signals are QCL to the UE by configuring values of the QCL_ID fields in the sub-configuration information, the E-SMLC may indicate, to the UE, which signals of PRS signals sent on carriers of a same type are QCL. For example, the E-SMLC sends, to the UE, a plurality of pieces of sub-configuration information: NB-IoT carrier #1 PRS sub-configuration information, NB-IoT carrier #2 PRS sub-configuration information, . . . , and NB-IoT carrier #m PRS sub-configuration information, where m=1, . . . , and M. PRS sub-configuration information of each NB-IoT carrier includes a QCL_ID field, for example, NB-IoT carrier #m PRS sub-configuration information={specific information such as QCL_ID #m and a PRS time-frequency resource}. If values of QCL_ID fields in PRS sub-configuration information of two NB-IoT carriers are the same, PRSs sent on the two NB-IoT carriers are QCL. If values of QCL_ID fields in PRS sub-configuration information of two NB-IoT carriers are different, PRSs sent on the two NB-IoT carriers are not QCL.

In other embodiments, by indicating which signals are QCL to the UE by configuring values of the QCL_ID fields in the sub-configuration information, the E-SMLC may indicate, to the UE, which signals of PRS signals sent on carriers of different types are QCL. For example, the E-SMLC sends, to the UE, a plurality of pieces of sub-configuration information: NB-IoT carrier #1 PRS sub-configuration information, NB-IoT carrier #2 PRS sub-configuration information, . . . , NB-IoT carrier #m PRS sub-configuration information, LTE carrier #1 PRS sub-configuration information, LTE carrier #2 PRS sub-configuration information, . . . , and LTE carrier #q PRS sub-configuration information, where m=1, . . . , and M, and q=1, . . . , Q. PRS sub-configuration information of each NB-IoT carrier includes one QCL_ID field, for example, NB-IoT carrier #m PRS sub-configuration information={specific information such as QCL_ID #m and a PRS time-frequency resource}, and PRS sub-configuration information of each LTE carrier includes one QCL_ID field, for example, LTE carrier #q PRS sub-configuration information={specific information such as QCL_ID #q and a PRS time-frequency resource}. If values of QCL_ID fields in PRS sub-configuration information of two NB-IoT carriers are the same, PRSs sent on the two NB-IoT carriers are QCL. If values of QCL_ID fields in PRS sub-configuration information of two NB-IoT carriers are different, PRSs sent on the two NB-IoT carriers are not QCL.

Optionally, in an example, the co-location rule is that at least two signals corresponding to at least two pieces of sub-configuration information included in different pieces of configuration information for which values of quasi co-location fields are the same are quasi co-located, and at least two signals corresponding to at least two pieces of sub-configuration information included in one piece of configuration information are quasi co-located.

Likewise, for example, the network side device is an E-SMLC, and a signal is a PRS. If the network side device determines that a plurality of PRS signals are QCL, the network side device may divide a plurality of pieces of sub-configuration information corresponding to the plurality of signals into two groups, add one group of sub-configuration information to one piece of configuration information and send the configuration information, add the other group of sub-configuration information to another piece of configuration information and send the another piece of the configuration information, and set a same value for QCL_ID fields in the two pieces of configuration information.

Specifically, in some embodiments, by indicating which signals are QCL to the UE by setting the values of the QCL_ID fields in the configuration information, the E-SMLC may indicate, to the UE, which signals of PRS signals sent on carriers of a same type are QCL. For example, the E-SMLC sends a plurality of pieces of configuration information to the UE: NB-IoT carrier configuration information #1, . . . , and NB-IoT carrier configuration information #n, where n=1, . . . , and N. Each piece of NB-IoT carrier configuration information includes one QCL_ID field, for example, NB-IoT carrier configuration information #n={QCL_ID #n, NB-IoT carrier #1 PRS configuration information, . . . , and NB-IoT carrier #m PRS configuration information}, where m=1, . . . , and M. In addition, values of QCL_ID fields in any two pieces of NB-IoT carrier configuration information may be the same or may be different. If values of QCL_ID fields in two pieces of NB-IoT carrier configuration information are the same, all PRS signals corresponding to the two pieces of NB-IoT carrier configuration information are QCL. If values of QCL_ID fields in two pieces of NB-IoT carrier configuration information are different, not all PRS signals corresponding to the two pieces of NB-IoT carrier configuration information are QCL.

In other embodiments, by indicating which signals are QCL to the UE by setting values of the QCL_ID fields in the configuration information, the E-SMLC may indicate, to the UE, which signals of PRS signals sent on carriers of different types are QCL. For example, the E-SMLC sends a plurality of pieces of configuration information to the UE: NB-IoT carrier configuration information #1, . . . , NB-IoT carrier configuration information #n, LTE carrier configuration information #1, . . . , and LTE carrier configuration information #p, where n=1, . . . , and N, p=1, . . . , and P, and both N and P are positive integers greater than or equal to 1. Each piece of NB-IoT carrier configuration information includes one QCL_ID field, and each piece of LTE carrier configuration information includes one QCL_ID field. For example, NB-IoT carrier configuration information #n={QCL_ID #n, NB-IoT carrier #1 PRS sub-configuration information, . . . , and NB-IoT carrier #m PRS sub-configuration information}, and LTE carrier configuration information #p={QCL_ID #p, LTE carrier #1 PRS sub-configuration information, . . . , and LTE carrier #q PRS sub-configuration information}, where m=1, . . . , and M, and q=1, . . . , and Q. If values of QCL_ID fields in two pieces of NB-IoT carrier configuration information are the same, all PRS signals corresponding to the two pieces of NB-IoT carrier configuration information are QCL. If values of QCL_ID fields in two pieces of NB-IoT carrier configuration information are different, not all PRS signals are QCL. If values of QCL_ID fields in two pieces of LTE carrier configuration information are the same, all PRS signals corresponding to the two pieces of LTE carrier configuration information are QCL. If values of QCL_ID fields in two pieces of LTE carrier configuration information are different, not all PRS signals are QCL. If a value of a QCL_ID field in one piece of NB-IoT carrier configuration information is the same as a value of a QCL_ID field in one piece of LTE carrier configuration information, a PRS signal corresponding to the NB-IoT carrier configuration information and a PRS signal corresponding to the LTE carrier configuration information are QCL. If a value of a QCL_ID field in one piece of NB-IoT carrier configuration information is different from a value of a QCL_ID field in one piece of LTE carrier configuration information, not all signals are QCL.

Figure 4:
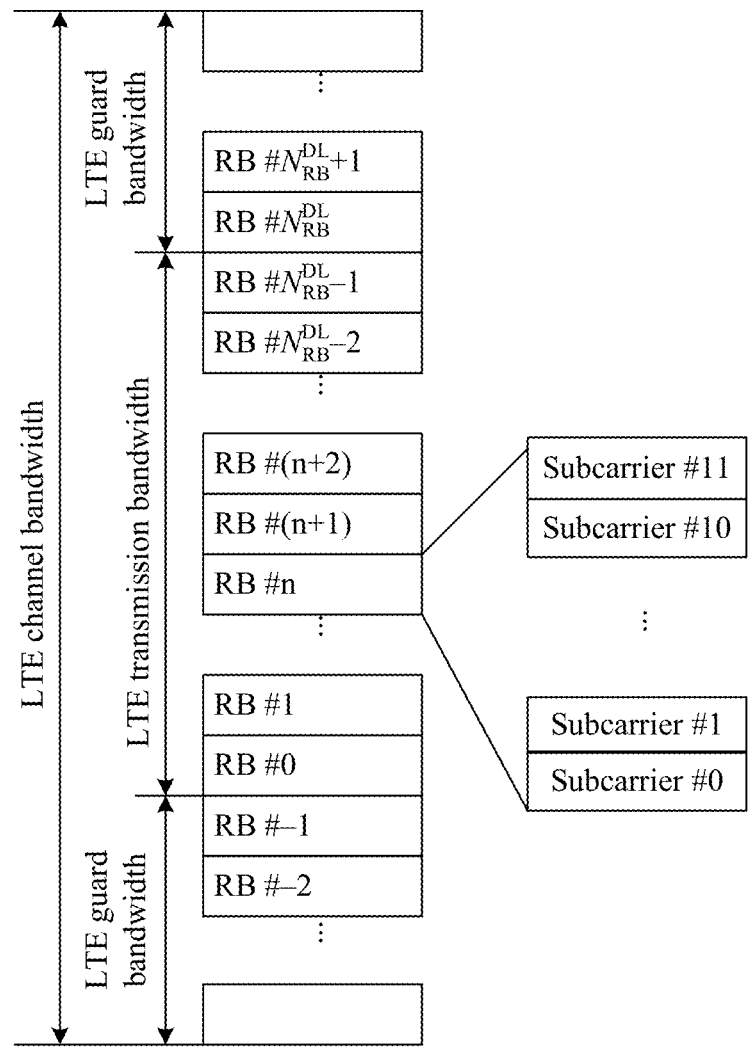
FIG. 4 is a schematic diagram of an NB-IoT carrier occupying an RB in LTE channel bandwidth according to an embodiment of this application.

In all the foregoing embodiments, optionally, as shown in FIG. 4, for an NB-IoT carrier with in-band deployment and/or guard band deployment, a plurality of NB-IoT carriers are located in channel bandwidth of an LTE network, and each NB-IoT carrier occupies one resource block (RB). The LTE channel bandwidth includes $N_{RB}^{max,DL}$ RBs, and transmission bandwidth includes $N_{RB}^{DL}$ RBs. Sequence numbers of RBs and sequence numbers of subcarriers in one RB are shown in FIG. 4. To accurately inform the UE of a center frequency of an NB-IoT carrier used to send a PRS and of a quadrature phase shift keying (QPSK) symbol used by the PRS on the NB-IoT carrier, the network side device sends a center frequency of the LTE carrier and location information of the NB-IoT carrier in the LTE carrier to the UE.

For example, the network side device sends center frequency information to the UE. The center frequency information is used to indicate a center frequency $f_0$ of the LTE carrier. NB-IoT carrier #n PRS sub-configuration information includes an offset parameter $\alpha_1$, and the offset parameter is determined by the network side device based on the center frequency of the LTE carrier and a center frequency $f_1$ of the NB-IoT carrier #n according to formula (1).

$$\alpha_1 = \begin{cases} \dfrac{f_1 - f_0 + 7.5 \text{ kHz}}{90 \text{ kHz}} - 1 & f_1 < f_0 \\ -1 & f_1 = f_0 \\ \dfrac{f_1 - f_0 - 7.5 \text{ kHz}}{90 \text{ kHz}} & f_1 > f_0 \end{cases} \quad (1)$$

It may be understood that when the network side device determines $\alpha_1$, if $N_{RB}^{DL}$ is an even number (for example, 6, 50, or 100), a value of $\alpha_1$ calculated by the network side device is an even number in $\{-N_{RB}^{max,DL}, -N_{RB}^{max,DL}+1, \ldots, N_{RB}^{max,DL}-1\}$; or if $N_{RB}^{DL}$ is an odd number (for example, 15, 25, or 75), a value of $\alpha_1$ calculated by the network side device is an odd number in $\{-N_{RB}^{max,DL}, -N_{RB}^{max,DL}+1, \ldots, N_{RB}^{max,DL}-1\}$. Alternatively, assuming that the NB-IoT carrier uses the in-band deployment mode, if $N_{RB}^{DL}$ is an even number (for example, 6, 50, or 100), a value of $\alpha_1$ calculated by the network side device is an even number in $\{-N_{RB}^{DL}, -N_{RB}^{DL}+1, \ldots, N_{RB}^{DL}-1\}$; or if $N_{RB}^{DL}$ is an odd number (for example, 15, 25, or 75), a value of $\alpha_1$ calculated by the network side device is an odd number in $\{-N_{RB}^{DL}, -N_{RB}^{DL}+1, \ldots, N_{RB}^{DL}-1\}$.

Correspondingly, after receiving the center frequency information and the offset parameter $\alpha_1$, the UE calculates the center frequency $f_1$ of the NB-IoT carrier #n according to formula (2).

$$f_1 = \begin{cases} f_0 - 7.5 \text{ kHz} + (\alpha_1 + 1) \cdot 90 \text{ kHz} & \alpha_1 < -1 \\ f_0 & \alpha_1 = -1 \\ f_0 + 7.5 \text{ kHz} + (\alpha_1 + 1) \cdot 90 \text{ kHz} & \alpha_1 > -1 \end{cases} \quad (2)$$

Further, the UE may calculate a sequence number n of an RB of the NB-IoT carrier #n on the LTE carrier according to $\alpha_1 = -N_{RB}^{DL} + 2 \cdot n$, and determine, according to $a_{k,l} = r_{l,n_s}(m')$, a subcarrier sequence number k of a resource element (RE) used by the PRS on an OFDM symbol l and a QPSK symbol $a_{k,l}$ used on the RE. The subcarrier sequence number k is a sequence number of a subcarrier in the NB-IoT carrier, a value range of the subcarrier sequence number is $\{0, 1, \ldots, \text{and } 11\}$, and $n_s$ is a radio frame number of a timeslot of the RE, where:

$k = 6m + (6 - l + v_{shift}) \bmod 6$ $v_{shift} = N_{ID}^{PRS} \bmod 6$ $m = 0, 1$ $m' = m + N_{RB}^{max,DL} + \alpha_1$ $N_{ID}^{PRS}$ is a PRS ID specified by the network side. If not specified, the PRS ID is an identifier of a cell to which the NB-IoT carrier #n belongs.

Alternatively, the network side device sends center frequency information to the UE, and the center frequency information is used to indicate a center frequency $f_0$ of the LTE carrier. NB-IoT carrier #n PRS configuration information includes an offset parameter $\alpha_1$, and the offset parameter is determined by the network side device based on the center frequency of the LTE carrier and a center frequency $f_1$ of the NB-IoT carrier #n according to formula (3).

$$\alpha_1 = \begin{cases} \dfrac{f_1 - f_0 + 7.5 \text{ kHz}}{90 \text{ kHz}} & f_1 < f_0 \\ 0 & f_1 = f_0 \\ \dfrac{f_1 - f_0 - 7.5 \text{ kHz}}{90 \text{ kHz}} & f_1 > f_0 \end{cases} \quad (3)$$

It may be understood that when the network side device determines $\alpha_1$ according to formula (3), if $N_{RB}^{DL}$ is an even number (for example, 6, 50, or 100), a value of $\alpha_1$ calculated by the network side device is an odd number in $\{-N_{RB}^{max,DL}, -N_{RB}^{max,DL}+1, \ldots, N_{RB}^{max,DL}-1\}$; or if $N_{RB}^{DL}$ is an odd number (for example, 15, 25, or 75), a value of $\alpha_1$ calculated by the network side device is an even number in $\{-N_{RB}^{max,DL}, -N_{RB}^{max,DL}+1, \ldots, N_{RB}^{max,DL}-1\}$. Alternatively, assuming that the NB-IoT carrier uses the in-band deployment mode, if $N_{RB}^{DL}$ is an even number (for example, 6, 50, or 100), a value of $\alpha_1$ calculated by the network side device is an odd number in $\{-N_{RB}^{DL}, -N_{RB}^{DL}+1, \ldots, N_{RB}^{DL}-1\}$; or if $N_{RB}^{DL}$ is an odd number (for example, 15, 25, or 75), a value of $\alpha_1$ calculated by the network side device is an even number in $\{-N_{RB}^{DL}, -N_{RB}^{DL}+1, \ldots, N_{RB}^{DL}-1\}$.

Correspondingly, after receiving the center frequency information and the offset parameter $\alpha_1$, the UE calculates the center frequency $f_1$ of the NB-IoT carrier #n according to formula (4).

$$f_1 = \begin{cases} f_0 - 7.5 \text{ kHz} + \alpha_1 \cdot 90 \text{ kHz} & \alpha_1 < 0 \\ f_0 & \alpha_1 = 0 \\ f_0 + 7.5 \text{ kHz} + \alpha_1 \cdot 90 \text{ kHz} & \alpha_1 > 0 \end{cases} \quad (4)$$

Further, the UE may calculate a sequence number n of a PRB of the NB-IoT carrier on the LTE carrier according to $\alpha_1 = -N_{RB}^{DL} + 2 \cdot n + 1$, and determine, according to $a_{k,l} = r_{l,n_s}(m')$, a subcarrier sequence number k of an RE used by the PRS on an OFDM symbol l and a QPSK symbol $a_{k,l}$ used on the RE. The subcarrier sequence number k is a sequence number of a subcarrier in the NB-IoT carrier, a value range of the subcarrier sequence number is $\{0, 1, \ldots, \text{and } 11\}$, and $n_s$ is a radio frame number of a timeslot of the RE, where:

$k = 6m + (6 - l + v_{shift}) \bmod 6$ $v_{shift} = N_{ID}^{PRS} \bmod 6$ $m = 0, 1$ $m' = m + N_{RB}^{max,DL} + \alpha_1 - 1$ $N_{ID}^{PRS}$ is a PRS ID specified by the network side. If not specified, the PRS ID is an identifier of a cell to which the NB-IoT carrier #n belongs.

Optionally, in an embodiment, for the in-band deployment mode and/or the guard band deployment mode shown in FIG. 4, the network side device sends center frequency information to the UE, and the center frequency information is used to indicate a center frequency $f_0$ of the LTE carrier. NB-IoT carrier #n PRS configuration information includes an offset parameter $\alpha_2$, and the offset parameter is determined by the network side device based on the center frequency of the LTE carrier and a center frequency $f_1$ of the NB-IoT carrier #n according to formula (5).

$$\alpha_2 = \begin{cases} \dfrac{f_1 - f_0 + 7.5 \text{ kHz}}{90 \text{ kHz}} + N_{RB}^{max,DL} - 1 & f_1 < f_0 \\ N_{RB}^{max,DL} - 1 & f_1 = f_0 \\ \dfrac{f_1 - f_0 - 7.5 \text{ kHz}}{90 \text{ kHz}} + N_{RB}^{max,DL} - 1 & f_1 > f_0 \end{cases} \quad (5)$$

It may be understood that when the network side device determines $\alpha_2$, if $N_{RB}^{DL}$ is an even number (for example, 6, 50, or 100), a value of $\alpha_2$ calculated by the network side device is an even number in $\{0, 1, \ldots, 2 \cdot N_{RB}^{max,DL}-1\}$; or if $N_{RB}^{DL}$ is an odd number (for example, 15, 25, or 75), a value of $\alpha_2$ calculated by the network side device is an odd number in $\{0, 1, \ldots, 2 \cdot N_{RB}^{max,DL}-1\}$.

Correspondingly, after receiving the center frequency information and the offset parameter $\alpha_2$, the UE calculates the center frequency $f_1$ of the NB-IoT carrier according to formula (6).

$$f_1 = \begin{cases} f_0 - 7.5 \text{ kHz} + (\alpha_2 - N_{RB}^{max,DL} + 1) \cdot 90 \text{ kHz} & \alpha_2 < N_{RB}^{max,DL} - 1 \\ f_0 & \alpha_2 = N_{RB}^{max,DL} - 1 \\ f_0 + 7.5 \text{ kHz} + (\alpha_2 - N_{RB}^{max,DL} + 1) \cdot 90 \text{ kHz} & \alpha_2 > N_{RB}^{max,DL} - 1 \end{cases} \quad (6)$$

Further, the UE may calculate a sequence number n of an RB of the NB-IoT carrier #n on the LTE carrier according to $\alpha_2 = N_{RB}^{max,DL} - N_{RB}^{DL} + 2 \cdot n$, and determine, according to $a_{k,l} = r_{l,n_s}(m')$, subcarrier sequence number k of an RE used by the PRS on an OFDM symbol l and a QPSK symbol $a_{k,l}$ used on the RE. The subcarrier sequence number k is a sequence number of a subcarrier in the NB-IoT carrier, a value range of the subcarrier sequence number is $\{0, 1, \ldots, \text{and } 11\}$, and $n_s$ is a radio frame number of a timeslot of the RE, where:

$k = 6m + (6 - l + v_{shift}) \bmod 6$ $v_{shift} = N_{ID}^{PRS} \bmod 6$ $m = 0, 1$ $m' = m + \alpha_2$ $N_{ID}^{PRS}$ is a PRS ID specified by the network side. If not specified, the PRS ID is an identifier of a cell to which the NB-IoT carrier #n belongs.

Alternatively, the network side device sends center frequency information to the UE, and the center frequency information is used to indicate a center frequency $f_0$ of the LTE carrier. NB-IoT carrier #n PRS configuration information includes an offset parameter $\alpha_2$, and the offset parameter is determined by the network side device based on the center frequency of the LTE carrier and a center frequency $f_1$ of the NB-IoT carrier #n according to formula (7).

$$\alpha_2 = \begin{cases} \dfrac{f_1 - f_0 + 7.5 \text{ kHz}}{90 \text{ kHz}} + N_{RB}^{max,DL} & f_1 < f_0 \\ N_{RB}^{max,DL} & f_1 = f_0 \\ \dfrac{f_1 - f_0 - 7.5 \text{ kHz}}{90 \text{ kHz}} + N_{RB}^{max,DL} & f_1 > f_0 \end{cases} \quad (7)$$

It may be understood that when the network side device determines $\alpha_2$ according to formula (7), if $N_{RB}^{DL}$ is an even number (for example, 6, 50, or 100), a value of $\alpha_2$ calculated by the network side device is an odd number in $\{0, 1, \ldots, 2 \cdot N_{RB}^{max,DL}-1\}$; or if $N_{RB}^{DL}$ is an odd number (for example, 15, 25, or 75), a value of $\alpha_2$ calculated by the network side device is an even number in $\{0, 1, \ldots, 2\cdot N_{RB}^{max,DL}-1\}$.

Correspondingly, after receiving the center frequency information and the offset parameter $\alpha_2$, the UE calculates the center frequency $f_1$ of the NB-IoT carrier according to formula (8).

$$f_1 = \begin{cases} f_0 - 7.5 \text{ kHz} + (\alpha_2 - N_{RB}^{max,DL})\cdot 90 \text{ kHz} & \alpha_2 < N_{RB}^{max,DL} \\ f_0 & \alpha_2 = N_{RB}^{max,DL} \\ f_0 + 7.5 \text{ kHz} + (\alpha_2 - N_{RB}^{max,DL}) & \alpha_2 > N_{RB}^{max,DL} \end{cases} \quad (8)$$

Further, the UE may calculate a sequence number n of an RB of the NB-IoT carrier on the LTE carrier according to $\alpha_2=N_{RB}^{max,DL}-N_{RB}^{DL}+2\cdot n+1$, and determine, according to $a_{k,l}=r_{l,n_s}(m')$, a subcarrier sequence number k of an RE used by the PRS on an OFDM symbol l and a QPSK symbol $a_{k,l}$ used on the RE. The subcarrier sequence number k is a sequence number of a subcarrier in the NB-IoT carrier, a value range of the subcarrier sequence number is $\{0, 1, \ldots, \text{and } 11\}$, and $n_s$ is a radio frame number of a timeslot of the RE, where:

$k=6m+(6-l+v_{shift})\bmod 6$ $v_{shift}=N_{ID}^{PRS} \bmod 6$ $m=0,1$ $m'=m+\alpha_2-1$ $N_{ID}^{PRS}$ is a PRS ID specified by the network side. If not specified, the PRS ID is an identifier of a cell to which the NB-IoT carrier #n belongs.

Alternatively, if the NB-IoT carrier uses the in-band deployment mode, the network side device sends center frequency information to the UE, and the center frequency information is used to indicate a center frequency $f_0$ of the LTE carrier. NB-IoT carrier #n PRS configuration information includes an offset parameter $\alpha_2$, and the offset parameter is determined by the network side device based on the center frequency of the LTE carrier and a center frequency $f_1$ of the NB-IoT carrier #n according to formula (9).

$$\alpha_2 = \begin{cases} \dfrac{f_1 - f_0 + 7.5 \text{ kHz}}{90 \text{ kHz}} + N_{RB}^{\prime DL} - 1 & f_1 < f_0 \\ N_{RB}^{\prime DL} - 1 & f_1 = f_0 \\ \dfrac{f_1 - f_0 - 7.5 \text{ kHz}}{90 \text{ kHz}} + N_{RB}^{\prime DL} - 1 & f_1 > f_0 \end{cases} \quad (9)$$

$N_{RB}^{DL}$ may be any integer of 6, 15, 25, 50, 75, and 100.

It may be understood that when the network side device determines $\alpha_2$, if $N_{RB}^{DL}$ is an even number (for example, 6, 50, or 100), a value of $\alpha_2$ calculated by the network side device is an even number in $\{0, 1, \ldots, 2\cdot N_{RB}^{DL}-1\}$; or if $N_{RB}^{DL}$ is an odd number (for example, 15, 25, or 75), a value of $\alpha_2$ calculated by the network side device is an odd number in $\{0, 1, \ldots, 2\cdot N_{RB}^{DL}-1\}$.

Correspondingly, after receiving the center frequency information and the offset parameter $\alpha_2$, the UE calculates the center frequency $f_1$ of the NB-IoT carrier according to formula (10).

$$f_1 = \begin{cases} f_0 - 7.5 \text{ kHz} + (\alpha_2 - N_{RB}^{\prime DL} + 1)\cdot 90 \text{ kHz} & \alpha_2 < N_{RB}^{\prime DL} - 1 \\ f_0 & \alpha_2 = N_{RB}^{\prime DL} - 1 \\ f_0 + 7.5 \text{ kHz} + (\alpha_2 - N_{RB}^{\prime DL} + 1)\cdot 90 \text{ kHz} & \alpha_2 > N_{RB}^{\prime DL} - 1 \end{cases} \quad (10)$$

Further, the UE may calculate a sequence number n of an RB of the NB-IoT carrier #n on the LTE carrier according to $\alpha_2=N_{RB}^{\prime DL}-N_{RB}^{DL}+2\cdot n$, and determine, according to $a_{k,l}=r_{l,n_s}(m')$, a subcarrier sequence number k of an RE used by the PRS on an OFDM symbol l and a QPSK symbol $a_{k,l}$ used on the RE. The subcarrier sequence number k is a sequence number of a subcarrier in the NB-IoT carrier, a value range of the subcarrier sequence number is $\{0, 1, \ldots, \text{and } 11\}$, and $n_s$ is a radio frame number of a timeslot of the RE, where:

$k=6m+(6-l+v_{shift})\bmod 6$ $v_{shift}=N_{ID}^{PRS} \bmod 6$ $m=0,1$ $m'=m+\alpha_2+(N_{RB}^{max,DL}-N_{RB}^{\prime DL})$.

$N_{ID}^{PRS}$ is a PRS ID specified by the network side. If not specified, the PRS ID is an identifier of a cell to which the NB-IoT carrier #n belongs.

Alternatively, if the NB-IoT carrier uses the in-band deployment mode, the network side device sends center frequency information to the UE, and the center frequency information is used to indicate a center frequency $f_0$ of the LTE carrier. NB-IoT carrier #n PRS configuration information includes an offset parameter $\alpha_2$, and the offset parameter is determined by the network side device based on the center frequency of the LTE carrier and a center frequency $f_1$ of the NB-IoT carrier #n according to formula (11).

$$\alpha_2 = \begin{cases} \dfrac{f_1 - f_0 + 7.5 \text{ kHz}}{90 \text{ kHz}} + N_{RB}^{\prime DL} & f_1 < f_0 \\ N_{RB}^{\prime DL} & f_1 = f_0 \\ \dfrac{f_1 - f_0 - 7.5 \text{ kHz}}{90 \text{ kHz}} + N_{RB}^{\prime DL} & f_1 > f_0 \end{cases} \quad (11)$$

$N_{RB}^{\prime DL}$ may be any integer of 6, 15, 25, 50, 75, and 100.

It may be understood that when the network side device determines $\alpha_2$ according to formula (11), if $N_{RB}^{DL}$ is an even number (for example, 6, 50, or 100), a value of $\alpha_2$ calculated by the network side device is an odd number in $\{0, 1, \ldots, 2\cdot N_{RB}^{DL}-1\}$; or if $N_{RB}^{DL}$ is an odd number (for example, 15, 25, or 75), a value of $\alpha_2$ calculated by the network side device is an even number in $\{0, 1, \ldots, 2\cdot N_{RB}^{DL}-1\}$.

Correspondingly, after receiving the center frequency information and the offset parameter $\alpha_2$, the UE calculates the center frequency $f_1$ of the NB-IoT carrier according to formula (12).

$$f_1 = \begin{cases} f_0 - 7.5 \text{ kHz} + (\alpha_2 - N_{RB}^{\prime DL})\cdot 90 \text{ kHz} & \alpha_2 < N_{RB}^{\prime DL} \\ f_0 & \alpha_2 = N_{RB}^{\prime DL} \\ f_0 + 7.5 \text{ kHz} + (\alpha_2 - N_{RB}^{\prime DL})\cdot 90 \text{ kHz} & \alpha_2 > N_{RB}^{\prime DL} \end{cases} \quad (12)$$

Further, the UE may calculate a sequence number n of an RB of the NB-IoT carrier on the LTE carrier according to $\alpha_2=N_{RB}^{\prime DL}-N_{RB}^{DL}+2\cdot n+1$, and determine $a_{k,l}=r_{l,n_s}(m')$, a subcarrier sequence number k of an RE used by the PRS on an OFDM symbol l and a QPSK symbol $a_{k,l}$ used on the RE. The subcarrier sequence number k is a sequence number of a subcarrier in the NB-IoT carrier, a value range of the subcarrier sequence number is {0, 1, . . . , and 11}, and $n_s$ is a radio frame number of a timeslot of the RE, where:

$$k=6m+(6-l+v_{shift}) \bmod 6$$

$$v_{shift}=N_{ID}^{PRS} \bmod 6$$

$$m=0,1$$

$$m'=m+\alpha_2+(N_{RB}^{max,DL}-N'_{RB}^{DL})-1.$$

$N_{ID}^{PRS}$ is a PRS ID specified by the network side. If not specified, the PRS ID is an identifier of a cell to which the NB-IoT carrier #n belongs.

Optionally, in an embodiment, the network side device sends center frequency information to the UE, and the center frequency information is used to indicate a center frequency $f_0$ of the LTE carrier. NB-IoT carrier #n PRS configuration information includes an offset parameter $\alpha_3$, and the offset parameter $\alpha_3$ is determined by the network side device based on the center frequency of the LTE carrier and a center frequency $f_1$ of the NB-IoT carrier #n according to formula (13) and formula (14).

$$\alpha_3 = \begin{cases} \frac{f_1-f_0+7.5\text{ kHz}}{180\text{ kHz}} & f_1 < f_0 \\ 0 & f_1 = f_0 \\ \frac{f_1-f_0-7.5\text{ kHz}}{180\text{ kHz}} & f_1 > f_0 \end{cases} \quad (13)$$

$$\alpha_3 = \begin{cases} \frac{f_1-f_0+7.5\text{ kHz}+90\text{ kHz}}{180\text{ kHz}}-1 & f_1 < f_0 \\ \frac{f_1-f_0-7.5\text{ kHz}-90\text{ kHz}}{180\text{ kHz}} & f_1 \geq f_0 \end{cases} \quad (14)$$

It should be noted that if $N_{RB}^{DL}$ is an odd number, the network side device determines $\alpha_3$ according to formula (13), or if $N_{RB}^{DL}$ is an even number, the network side device determines $\alpha_3$ according to formula (14).

Correspondingly, after receiving the center frequency information and the offset parameter $\alpha_3$, the UE determines the center frequency $f_1$ of the NB-IoT carrier #n according to formula (15) and formula (16).

$$f_1 = \begin{cases} f_0-7.5\text{ kHz}+\alpha_3 \cdot 180\text{ kHz} & \alpha_3 < 0 \\ f_0 & \alpha_3 = 0 \\ f_0+7.5\text{ kHz}+\alpha_3 \cdot 180\text{ kHz} & \alpha_3 > 0 \end{cases} \quad (15)$$

$$f_1 = \begin{cases} f_0-7.5\text{ kHz}-90\text{ kHz}+(\alpha_3+1)\cdot 180\text{ kHz} & \alpha_3 < 0 \\ f_0+7.5\text{ kHz}+90\text{ kHz}+\alpha_3 \cdot 180\text{ kHz} & \alpha_3 \geq 0 \end{cases} \quad (16)$$

It should be noted that if $N_{RB}^{DL}$ is an odd number, the UE determines $f_1$ according to formula (15), or if $N_{RB}^{DL}$ is an even number, the UE determines $f_1$ according to formula (16).

Further, the UE may calculate a sequence number n of an RB of the NB-IoT carrier #n on the LTE carrier according to $n=\alpha_3+\lfloor N_{RB}^{DL}/2 \rfloor$, and determine, according to $a_{k,l}=r_{l,n_s}(m')$, a subcarrier sequence number k of an RE used by the PRS on an OFDM symbol l and a QPSK symbol $a_{k,l}$ used on the RE. The subcarrier sequence number k is a sequence number of a subcarrier in the NB-IoT carrier, a value range of the subcarrier sequence number is {0, 1, . . . , and 11}, and $n_s$ is a radio frame number of a timeslot of the RE, where:

$$k=6m+(6-l+v_{shift}) \bmod 6$$

$$v_{shift}=N_{ID}^{PRS} \bmod 6$$

$$m=0,1$$

$N_{ID}^{PRS}$ is a PRS ID specified by the network side. If not specified, the PRS ID is an identifier of a cell to which the NB-IoT carrier #n belongs.

$m'=m+N_{RB}^{max,DL}+2\cdot\alpha_3-1$, and $N_{RB}^{DL}$ is an odd number.

$m'=m+N_{RB}^{max,DL}+2\cdot\alpha_3$, and $N_{RB}^{DL}$ is an even number.

Optionally, in an example, when the NB-IoT carrier uses the in-band deployment and/or the guard band deployment mode, the network side device may indicate $\alpha_3$ in an implicit indication manner. For example, a correspondence between location information $I_{PRS}$ and either of LTE bandwidth information and $\alpha_3$ that is corresponding to the NB-IoT carrier is agreed between the network side device and the UE in advance. Table 1 shows a correspondence between $I_{PRS}$ and either of LTE bandwidth information and $\alpha_3$ that is corresponding to the NB-IoT carrier.

TABLE 1

| $I_{PRS}$ | $\alpha_3$ when $N_{RB}^{DL}$ is an odd number | $I_{PRS}$ | $\alpha_3$ when $N_{RB}^{DL}$ is an odd number |
|---|---|---|---|
| 0, 1, . . . , 81, 82 | −41, −40, . . . , 40, 41 | 83, 84, . . . , 191, 192 | −55, −54, . . . , 53, 54 |

For example, the network side device sends the center frequency information and $I_{PRS}$ to the UE. When the UE receives the center frequency information and $I_{PRS}$, based on $I_{PRS}$, the UE determines whether $N_{RB}^{DL}$ is odd or even and determines a value of $\alpha_3$. For example, when $I_{PRS}$ is 1, the UE determines that a quantity $N_{RB}^{DL}$ of RBs in the LTE carrier transmission bandwidth is an odd number and $\alpha_3=-40$ corresponding to the NB-IoT carrier.

Optionally, when the NB-IoT carrier uses only the in-band deployment mode, the network side device may also indicate $\alpha_3$ in an implicit indication manner. For example, a correspondence between location information $I_{PRS}$ and either of LTE bandwidth information and $\alpha_3$ that is corresponding to the NB-IoT carrier is agreed between the network side device and the UE in advance. Table 2 shows a correspondence between $I_{PRS}$ and either of LTE bandwidth information and $\alpha_3$ that is corresponding to the NB-IoT carrier.

TABLE 2

| $I_{PRS}$ | $\alpha_3$ when $N_{RB}^{DL}$ is an odd number | $I_{PRS}$ | $\alpha_3$ when $N_{RB}^{DL}$ is an odd number |
|---|---|---|---|
| 0, 1, . . . , 73, 74 | −37, −36, . . . , 36, 37 | 75, 76, . . . , 173, 174 | −50, −49, . . . , 48, 49 |

For example, the network side device sends the center frequency information and $I_{PRS}$ to the UE. When the UE receives the center frequency information and $I_{PRS}$, based on $I_{PRS}$, the UE determines whether $N_{RB}^{DL}$ is odd or even and determines a value of $\alpha_3$. For example, when $I_{PRS}$ is 1, the UE determines that a quantity $N_{RB}^{DL}$ of RBs in the LTE carrier transmission bandwidth is an odd number and $\alpha_3=-36$ corresponding to the NB-IoT carrier.

Figure 5:
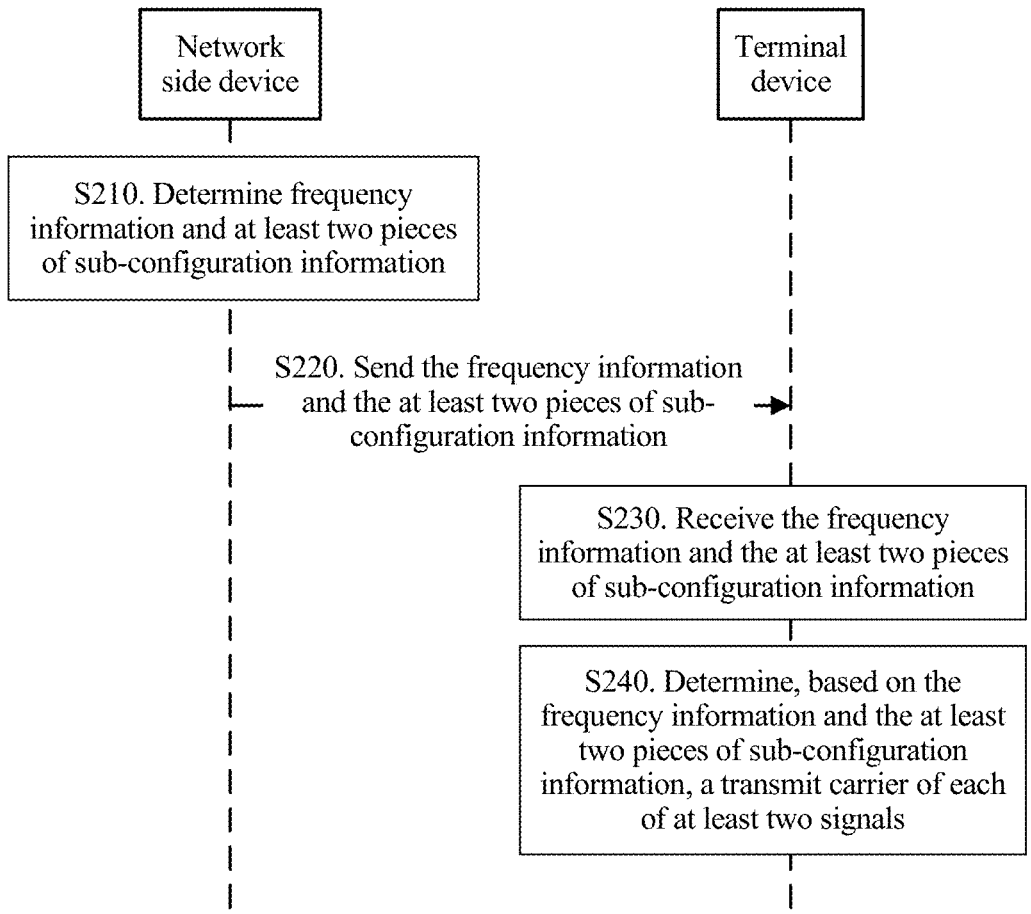
FIG. 5 is a schematic flowchart of a communication method according to another embodiment of this application.

FIG. 5 shows a communication method according to another embodiment of this application. As shown in FIG. 5, a method 200 includes the following steps.

S210. A network side device determines frequency information and at least two pieces of sub-configuration information, where transmit carriers of at least two signals corresponding to the at least two pieces of sub-configuration information are located in one target carrier in a cellular network, the frequency information is used to indicate a center frequency of the target carrier, each piece of sub-configuration information includes offset information, and the offset information is used by a terminal device to determine, based on the offset information and the frequency information, a transmit carrier of a signal corresponding to the sub-configuration information.

S220. The network side device sends the frequency information and the at least two pieces of sub-configuration information to the terminal device.

S230. The terminal device receives the frequency information and the at least two pieces of sub-configuration information that are sent by the network side device.

S240. The terminal device determines, based on the frequency information and the at least two pieces of sub-configuration information, a transmit carrier of each of the at least two signals.

Optionally, the network side device may add the frequency information and a plurality of pieces of sub-configuration information to one piece of information, and send the information to the terminal device.

It should be noted that the offset information included in each piece of sub-configuration information in the method 200 is the same as that in the method 100. To avoid repetition, details are not described herein again.

Figure 6:
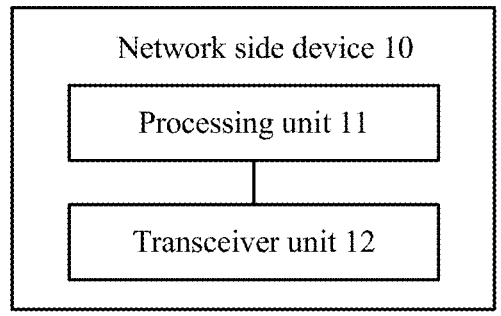
FIG. 6 is a schematic block diagram of a network side device according to an embodiment of this application.

The foregoing describes in detail the communication method according to embodiments of this application with reference to FIG. 3 to FIG. 5, and the following describes in detail a network side device according to an embodiment of this application with reference to FIG. 6. As shown in FIG. 6, a network side device 10 includes:

a processing unit 11, configured to determine at least two pieces of target sub-configuration information according to a co-location rule, where at least two target signals corresponding to the at least two pieces of target sub-configuration information are quasi co-located; and a transceiver unit 12, configured to send, according to the co-location rule, the at least two pieces of target sub-configuration information determined by the processing unit 11 to the terminal device.

In some embodiments, the processing unit 11 is further configured to: when the co-location rule is that at least two signals corresponding to at least two pieces of sub-configuration information included in one piece of configuration information are quasi co-located, determine target configuration information according to the co-location rule, where the target configuration information includes the at least two pieces of target sub-configuration information; and the transceiver unit 12 is further configured to send the target configuration information determined by the processing unit 11 to the terminal device.

In some embodiments, the processing unit 11 is further configured to: when the co-location rule is that at least two signals corresponding to different pieces of sub-configuration information for which values of quasi co-location identifier ID fields are the same are quasi co-located, determine, according to the co-location rule, a value of a target quasi co-location ID field included in each piece of target sub-configuration information, where values of target quasi co-location ID fields included in the at least two pieces of target sub-configuration information are the same.

In some embodiments, the processing unit 11 is further configured to: determine an identifier of a target cell as the value of the target quasi co-location ID field, where the target cell is a cell to which a target carrier belongs, and the target carrier is a carrier in a cellular network in which transmit carriers of the at least two target signals are jointly located, or the target carrier is a transmit carrier of any target signal in the at least two target signals; or determine an identifier of a target transmission point as the value of the target quasi co-location ID field, where the target transmission point is a transmission point jointly corresponding to transmit carriers of the at least two target signals.

In some embodiments, the processing unit 11 is further configured to: when the target quasi co-location ID field includes a first subfield and a second subfield, determine an identifier of a target cell as a value of the first subfield, where the target cell is a cell to which a target carrier belongs, and the target carrier is a carrier in a cellular network in which transmit carriers of the at least two target signals are jointly located, or the target carrier is a transmit carrier of any target signal in the at least two target signals; and determine an identifier of a target transmission point as a value of the second subfield, where the target transmission point is a transmission point jointly corresponding to transmit carriers of the at least two target signals.

In some embodiments, the processing unit 11 is further configured to: when the co-location rule is that at least two signals corresponding to at least two pieces of sub-configuration information included in different pieces of configuration information for which values of quasi co-location ID fields are the same are quasi co-located, and at least two signals corresponding to at least two pieces of sub-configuration information included in one piece of configuration information are quasi co-located, determine target configuration information according to the co-location rule, where the target configuration information includes the at least two pieces of target sub-configuration information and a target quasi co-location ID field; and the transceiver unit 12 is further configured to send the target configuration information determined by the processing unit 11 to the terminal device.

In some embodiments, transmit carriers of the at least two target signals are located in one target carrier in a cellular network, the target configuration information further includes center frequency information of the target carrier, each piece of target sub-configuration information includes offset information, and the offset information is used by the terminal device to determine, based on the center frequency information and the offset information, a transmit carrier of a target signal corresponding to the target sub-configuration information.

In some embodiments, transmit carriers of at least two target signals in the at least two target signals are different.

In some embodiments, the at least two target signals are positioning reference signals.

It should be noted that the processing unit 11 may be implemented by a processor, and the transceiver unit 12 may be implemented by a transceiver. For beneficial effects of this embodiment, refer to the foregoing method embodiments. For brevity, details are not described herein again.

Figure 7:
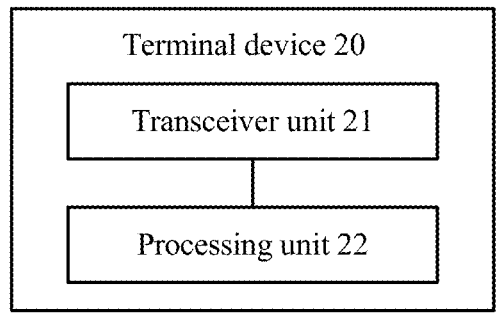
FIG. 7 is a schematic block diagram of a terminal device according to an embodiment of this application.

FIG. 7 shows a terminal device according to an embodiment of this application. As shown in FIG. 7, a terminal device 20 includes:

a transceiver unit 21, configured to receive at least two pieces of target sub-configuration information sent by a network side device, where the at least two pieces of target sub-configuration information are determined by the network side device according to a co-location rule, and at least two target signals corresponding to the at least two pieces of target sub-configuration information are quasi co-located; and a processing unit 22, configured to determine, according to the co-location rule, that the at least two target signals corresponding to the at least two pieces of target sub-configuration information received by the transceiver unit are quasi co-located.

In some embodiments, the transceiver unit 21 is further configured to: when the co-location rule is that at least two signals corresponding to at least two pieces of sub-configuration information included in one piece of configuration information are quasi co-located, receive target configuration information sent by the network side device, where the target configuration information includes the at least two pieces of target sub-configuration information.

In some embodiments, the transceiver unit 21 is further configured to: when the co-location rule is that at least two signals corresponding to different pieces of sub-configuration information for which values of quasi co-location identifier ID fields are the same are quasi co-located, receive the at least two pieces of target sub-configuration information sent by the network side device, where each piece of target sub-configuration information includes a target quasi co-location ID field, and values of target quasi co-location ID fields included in the at least two pieces of target sub-configuration information are the same.

In some embodiments, the value of the target quasi co-location ID field is an identifier of a target cell, the target cell is a cell to which a target carrier belongs, and the target carrier is a carrier in a cellular network in which transmit carriers of the at least two target signals are jointly located, or the target carrier is a transmit carrier of any target signal in the at least two target signals; or the value of the target quasi co-location ID field is an identifier of a target transmission point, and the target transmission point is a transmission point jointly corresponding to transmit carriers of the at least two target signals.

In some embodiments, the target quasi co-location ID field includes a first subfield and a second subfield, a value of the first subfield is an identifier of a target cell, a value of the second subfield is an identifier of a target transmission point, the target cell is a cell to which a target carrier belongs, the target carrier is a carrier in a cellular network in which transmit carriers of the at least two target signals are jointly located, or the target carrier is a transmit carrier of any target signal in the at least two target signals, and the target transmission point is a transmission point jointly corresponding to transmit carriers of the at least two target signals.

In some embodiments, the transceiver unit 21 is further configured to: when the co-location rule is that at least two signals corresponding to at least two pieces of sub-configuration information included in different pieces of configuration information for which values of quasi co-location ID fields are the same are quasi co-located, and at least two signals corresponding to at least two pieces of sub-configuration information included in one piece of configuration information are quasi co-located, receive target configuration information sent by the network side device, where the target configuration information includes the at least two pieces of target sub-configuration information and a target quasi co-location ID field.

In some embodiments, the processing unit 22 is further configured to: when transmit carriers of the at least two target signals are located in one target carrier in a cellular network, the target configuration information further includes center frequency information of the target carrier, each piece of target sub-configuration information includes offset information, and the offset information is used by the terminal device to determine, based on the center frequency information and the offset information, a transmit carrier of a target signal corresponding to the target sub-configuration information, determine a transmit carrier of each target signal based on the frequency information and the offset information included in each piece of target sub-configuration information; and the transceiver unit 21 is further configured to receive the at least two target signals based on the transmit carrier determined by the processing unit 22 for each target signal.

In some embodiments, the processing unit 22 is further configured to determine a signal processing result based on the at least two target signals; and the transceiver unit 21 is further configured to send the signal processing result to the network side device.

In some embodiments, transmit carriers of at least two target signals in the at least two target signals are different.

In some embodiments, the at least two target signals are positioning reference signals.

It should be noted that the transceiver unit 21 may be implemented by a transceiver, and the processing unit 22 may be implemented by a processor. For beneficial effects of this embodiment, refer to the foregoing method embodiments. For brevity, details are not described herein again.

Figure 8:
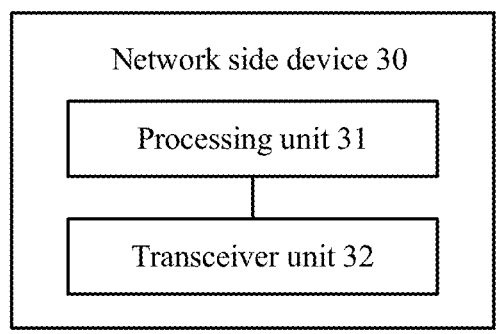
FIG. 8 is a schematic block diagram of a network side device according to another embodiment of this application.

FIG. 8 shows a network side device according to another embodiment of this application. As shown in FIG. 8, a network side device 30 includes:

a processing unit 31, configured to determine frequency information and at least two pieces of sub-configuration information, where transmit carriers of at least two signals corresponding to the at least two pieces of sub-configuration information are located in one target carrier in a cellular network, the frequency information is used to indicate a center frequency of the target carrier, each piece of sub-configuration information includes offset information, and the offset information is used by a terminal device to determine, based on the offset information and the frequency information, a transmit carrier of a signal corresponding to the sub-configuration information; and a transceiver unit 32, configured to send the frequency information and the at least two pieces of sub-configuration information to the terminal device.

In some embodiments, the transceiver unit is further configured to send configuration information to the terminal device, where the configuration information includes the frequency information and the at least two pieces of sub-configuration information.

It should be noted that the processing unit 31 may be implemented by a processor, and the transceiver unit 32 may be implemented by a transceiver. For beneficial effects of this embodiment, refer to the foregoing method embodiments. For brevity, details are not described herein again.

Figure 9:
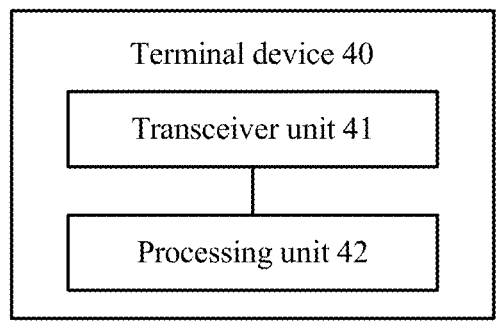
FIG. 9 is a schematic block diagram of a terminal device according to another embodiment of this application.

FIG. 9 shows a terminal device according to another embodiment of this application. As shown in FIG. 9, a terminal device 40 includes:

a transceiver unit 41, configured to receive frequency information and at least two pieces of sub-configuration information that are sent by a network side device, where transmit carriers of at least two signals corresponding to the at least two pieces of sub-configuration information are located in one target carrier in a cellular network, the frequency information is used to indicate a center frequency of the target carrier, each piece of sub-configuration information includes offset information, and the offset information is used by a terminal device to determine, based on the offset information and the frequency information, a transmit carrier of a signal corresponding to the sub-configuration information; and a processing unit 42, configured to determine a transmit carrier of each of the at least two signals based on the frequency information and the at least two pieces of sub-configuration information.

In some embodiments, the transceiver unit 41 is further configured to receive configuration information sent by the network side device, where the configuration information includes the frequency information and the at least two pieces of sub-configuration information.

It should be noted that the transceiver unit 41 may be implemented by a transceiver, and the processing unit 42 may be implemented by a processor. For beneficial effects of this embodiment, refer to the foregoing method embodiments. For brevity, details are not described herein again.

Figure 10:
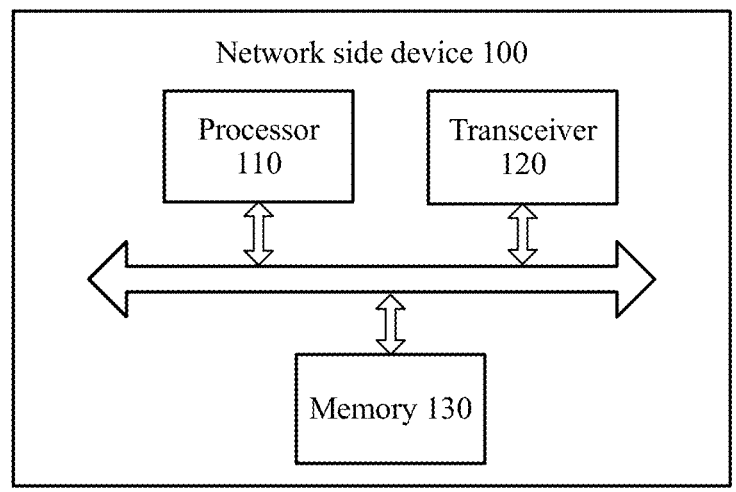
FIG. 10 is a schematic block diagram of a network side device according to still another embodiment of this application.

FIG. 10 is a schematic structural diagram of a network side device 100 according to still another embodiment of the present application. As shown in FIG. 10, the network side device 100 includes a processor 110 and a transceiver 120. The processor 110 is connected to the transceiver 120. Optionally, the network side device 100 further includes a memory 130, and the memory 130 is connected to the processor 110 and the transceiver 120. The processor 110, the memory 130, and the transceiver 120 may communicate with each other by using an inner connection path. The memory 130 may be configured to store code or the like to be executed by the processor 110. The transceiver 120 is configured to receive and send a signal under control of the processor 110.

The network side device 100 may be corresponding to the network side device in the communication method in the method 100 or the method 200 and the network side device 10 or the network side device 30 according to embodiments of this application. For brevity, details are not described herein again.

Figure 11:
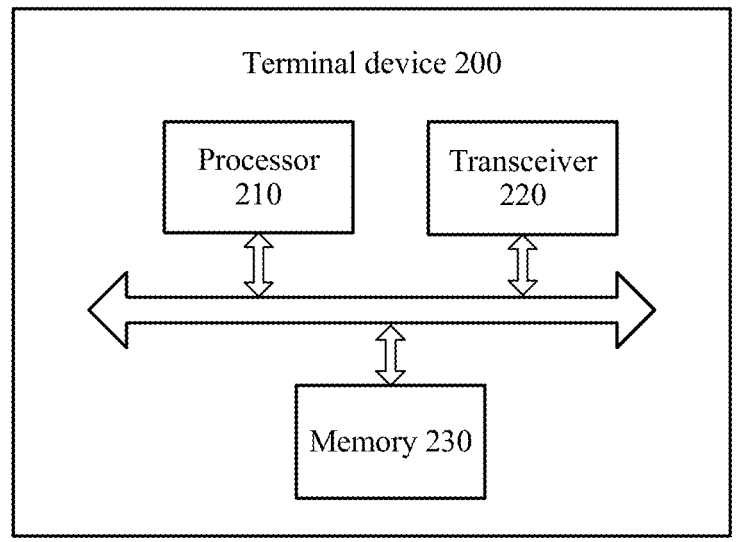
FIG. 11 is a schematic block diagram of a terminal device according to still another embodiment of this application.

FIG. 11 is a schematic structural diagram of a terminal device 200 according to still another embodiment of the present application. As shown in FIG. 11, the terminal device 200 includes a processor 210 and a transceiver 220. The processor 210 is connected to the transceiver 220. Optionally, the terminal device 200 further includes a memory 230, and the memory 230 is connected to the processor 210 and the transceiver 220. The processor 210, the memory 230, and the transceiver 220 may communicate with each other by using an inner connection path. The memory 230 may be configured to store code or the like to be executed by the processor 210. The transceiver 220 is configured to receive and send a signal under control of the processor 210.

The terminal device 200 may be corresponding to the terminal device in the communication method in the method 100 or the method 200 and the terminal device 20 or the terminal device 40 according to embodiments of this application. For brevity, details are not described herein again.

It should be noted that the processor in embodiments of this application may be an integrated circuit chip and is capable of signal processing. The processor may further be a general purpose processor, a digital signal processor (DSP), an application-specific integrated circuit (ASIC), a field programmable gate array (FPGA) or another programmable logic device, a discrete gate or a transistor logic device, or a discrete hardware component, and may implement or perform the methods, steps, and logical block diagrams disclosed in embodiments of this application. The general purpose processor may be a microprocessor, or the processor may be any normal processor or the like.

The memory in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. For example but not for limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and method described in this specification aims to include but is not limited to these memories and any memory of another proper type.

A person of ordinary skill in the art may be aware that, the units and steps in the examples described with reference to embodiments disclosed herein may be implemented by electronic hardware, computer software, or a combination thereof. To clearly describe the interchangeability between the hardware and the software, the foregoing has generally described compositions and steps of each example based on functions. Whether the functions are performed by hardware or software depends on specific applications and design constraint conditions of the technical solutions. A person skilled in the art may use different methods to implement the described functions for each specific application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual needs to achieve objectives of solutions of embodiments of this application.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware or a combination thereof. When this application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by this application includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above are merely examples of embodiments of technical solutions of this application, but is not intended to limit the protection scope of this application. Any modification, equivalent replacement, or improvement made without departing from the spirit and principle of this application may fall within the protection scope of this application.

What is claimed is:

1. A communication method, comprising:
   determining, by a network side device, whether at least two signals are quasi co-located;
   determining, by the network side device, based on whether the at least two signals are quasi co-located, a manner of sending configuration information to a terminal device, wherein:
   in case the at least two signals are not quasi co-located, the determined manner of sending configuration information to the terminal device includes separately adding sub-configuration information to at least two pieces of configuration information and separately sending the at least two pieces of configuration information to the terminal device; and
   in case the at least two signals are quasi co-located, the determined manner of sending configuration information to the terminal device includes sending one piece of configuration information to the terminal device, wherein the one piece of configuration information includes at least two pieces of sub-configuration information corresponding to the at least two signals; and
   sending, by the network side device, the configuration information to the terminal device according to the determined manner of sending the configuration information to the terminal device.

2. The method according to claim 1, wherein the at least two pieces of sub-configuration information comprise quasi co-location identifier (ID) fields, wherein values of quasi co-location ID fields comprised in the at least two pieces of sub-configuration information being the same indicates that the at least two signals corresponding to the at least two pieces of sub-configuration information are quasi co-located.

3. The method according to claim 1, wherein the at least two signals are positioning reference signals.

4. A communication method, comprising:
   receiving, by a terminal device, configuration information from a network side device; and
   determining, by the terminal device, whether at least two signals are quasi co-located based on a manner in which the configuration information was received, wherein:
   the at least two signals are determined as not being quasi co-located in case the configuration information is received as at least two separate pieces of configuration information from the network side device, wherein the at least two separate pieces of configuration information have sub-configuration information added thereto; and
   the at least two signals are determined as being quasi co-located in case the configuration information is received as one piece of configuration information comprising at least two pieces of sub-configuration information corresponding to the at least two signals.

5. The method according to claim 4, wherein the at least two pieces of sub-configuration information comprise quasi co-location identifier (ID) fields, wherein values of quasi co-location ID fields comprised in the at least two pieces of sub-configuration information being the same indicates that, the at least two target signals corresponding to the at least two pieces of sub-configuration information are quasi co-located.

6. The method according to claim 4, wherein the method further comprises:
   determining, by the terminal device, a signal processing result based on the at least two signals; and
   sending, by the terminal device, the signal processing result to the network side device.

7. The method according to claim 4, wherein the at least two signals are positioning reference signals.

8. A communication device, comprising a processor and a non-transitory memory having instructions stored thereon, wherein the instructions, when executed by the processor, facilitate:
   determining whether at least two signals are quasi co-located;
   determining, based on whether the at least two signals are quasi co-located, a manner of sending configuration information to a terminal device, wherein:

in case the at least two signals are not quasi co-located, the determined manner of sending configuration information to the terminal device includes separately adding sub-configuration information to at least two pieces of configuration information and separately sending the at least two pieces of configuration information to the terminal device; and in case the at least two signals are quasi co-located, the determined manner of sending configuration information to the terminal device includes sending one piece of configuration information to the terminal device, wherein the one piece of configuration information includes at least two pieces of sub-configuration information corresponding to the at least two signals; and sending the configuration information to the terminal device according to the determined manner of sending the configuration information to the terminal device.

9. The communication device according to claim 8, wherein the at least two pieces of sub-configuration information comprise quasi co-location identifier (ID) fields, wherein values of quasi co-location ID fields comprised in the at least two pieces of sub-configuration information being the same indicates that the at least two signals corresponding to the at least two pieces of sub-configuration information are quasi co-located.

10. The communication device according claim 8, wherein the at least two signals are positioning reference signals.

11. A communication device, comprising a processor and a non-transitory memory having instructions stored thereon, wherein the instructions, when executed by the processor, facilitate:

receiving configuration information from a network side device; and determining whether at least two signals are quasi co-located based on a manner in which the configuration information was received, wherein:

the at least two signals are determined as not being quasi co-located in case the configuration information is received as at least two separate pieces of configuration information from the network side device, wherein the at least two separate pieces of configuration information have sub-configuration information added thereto; and the at least two signals are determined as being quasi co-located in case the configuration information is received as one piece of configuration information comprising at least two pieces of sub-configuration information corresponding to the at least two signals.

12. The communication device according to claim 11, wherein the at least two pieces of sub-configuration information comprise quasi co-location identifier (ID) fields, wherein values of quasi co-location ID fields comprised in the at least two pieces of sub-configuration information being the same indicates that the at least two signals corresponding to the at least two pieces of sub-configuration information are quasi co-located.

13. The communication device according to claim 11, wherein the instructions, when executed by the processor, further facilitate:

determining a signal processing result based on the at least two signals; and sending the signal processing result to the network side device.

14. The communication device according to claim 11, wherein the at least two signals are positioning reference signals.

* * * * *